(12) United States Patent
Peng et al.

(10) Patent No.: US 12,004,061 B2
(45) Date of Patent: Jun. 4, 2024

(54) BLUETOOTH COMMUNICATION METHOD AND DUAL-MODE BLUETOOTH TERMINAL

(71) Applicant: Huawei Technologies Co., Ltd., Shenzhen (CN)

(72) Inventors: Yunsheng Peng, Shanghai (CN); Zhonglin Xia, Shanghai (CN); Chun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 794 days.

(21) Appl. No.: 17/264,491

(22) PCT Filed: Aug. 1, 2018

(86) PCT No.: PCT/CN2018/098123
§ 371 (c)(1),
(2) Date: Jan. 29, 2021

(87) PCT Pub. No.: WO2020/024180
PCT Pub. Date: Feb. 6, 2020

(65) Prior Publication Data
US 2022/0030403 A1    Jan. 27, 2022

(51) Int. Cl.
*H04W 4/80* (2018.01)
*H04W 4/23* (2018.01)
(Continued)

(52) U.S. Cl.
CPC ............. *H04W 4/80* (2018.02); *H04W 4/23* (2018.02); *H04W 12/50* (2021.01); *H04W 68/005* (2013.01); *H04W 80/02* (2013.01)

(58) Field of Classification Search
CPC ......... H04W 4/80; H04W 4/23; H04W 12/50; H04W 12/02; H04W 12/08;
(Continued)

(56) References Cited

U.S. PATENT DOCUMENTS 9,265,080 B1 * 2/2016 Palin .................. H04W 76/15
9,715,816 B1 * 7/2017 Adler .................. G06F 16/86
(Continued)

FOREIGN PATENT DOCUMENTS

CN     201860397 U     6/2011
CN     103368722 A *  10/2013   ......... H04L 63/0272
(Continued)

OTHER PUBLICATIONS

"Bluetooth SDK Developer's Guide, SDK version 3.2.0, Rev 1.0," Aug. 8, 2017, 170 pages, XP055808166. URL: https://toshiba.semicon-storage.com/content/dam/toshibass/emea/en_gb/bluetooth/data/bluetooth_sdk_v3_2_0_developers_guiderevl 0.pdf.

*Primary Examiner* — Chi H Pham
*Assistant Examiner* — Vladislav Y Agureyev
(74) *Attorney, Agent, or Firm* — Conley Rose, P.C.

(57) ABSTRACT

A dual-mode Bluetooth terminal configured to receive a first input from a user, send a first BLE pairing advertisement message in response to the first input, where an address type in the first BLE pairing advertisement message is public, an advertisement address in the first BLE pairing advertisement message is a fixed advertisement address, and the first BLE pairing advertisement message carries an identifier used to indicate that the first dual-mode Bluetooth terminal does not support bit rate/enhanced data rate (BR/EDR), receive a second input from the user, enter a conventional Bluetooth discoverable mode in response to the second input, receive a paging message, and send a paging response in response to the paging message, where the paging response carries a media access control (MAC) address of the first dual-mode Bluetooth terminal, and the first input is different from the second input.

20 Claims, 13 Drawing Sheets

(51) Int. Cl.
*H04W 12/50* (2021.01)
*H04W 68/00* (2009.01)
*H04W 80/02* (2009.01)

(58) Field of Classification Search
CPC ... H04W 68/005; H04W 68/00; H04W 80/02; H04W 76/11; H04W 84/18; H04W 88/06; H04M 1/72415; H04L 63/0407
See application file for complete search history.

(56) References Cited

U.S. PATENT DOCUMENTS

| | | | |
|---|---|---|---|
| 2013/0040573 A1* | 2/2013 | Hillyard | H04W 8/005 455/41.2 |
| 2013/0194968 A1 | 8/2013 | Masuda | |
| 2013/0259230 A1 | 10/2013 | Polo et al. | |
| 2014/0323048 A1 | 10/2014 | Kang | |
| 2015/0036065 A1 | 2/2015 | Yousefpor et al. | |
| 2015/0172901 A1 | 6/2015 | Kasslin et al. | |
| 2017/0201886 A1* | 7/2017 | Yang | H04W 12/06 |
| 2017/0208639 A1* | 7/2017 | Lee | H04W 4/80 |
| 2017/0215030 A1* | 7/2017 | Choi | H04W 4/80 |
| 2017/0215113 A1* | 7/2017 | Lee | H04W 48/14 |
| 2017/0223579 A1* | 8/2017 | Lee | H04W 52/02 |
| 2017/0223615 A1* | 8/2017 | Lee | H04W 36/03 |
| 2018/0103338 A1 | 4/2018 | Lu et al. | |
| 2018/0152891 A1* | 5/2018 | Xie | H04W 52/0235 |
| 2018/0152979 A1* | 5/2018 | Lee | H04W 8/005 |
| 2018/0255426 A1* | 9/2018 | Liao | H04W 4/021 |
| 2018/0324570 A1* | 11/2018 | Ben-Shachar | H04W 74/085 |
| 2019/0028141 A1* | 1/2019 | Padden | H04B 1/7156 |
| 2019/0281450 A1 | 9/2019 | Lu et al. | |
| 2021/0274315 A1* | 9/2021 | Daoura | H04W 4/38 |

FOREIGN PATENT DOCUMENTS

| | | | | | |
|---|---|---|---|---|---|
| CN | 103368722 | A | | 10/2013 | |
| CN | 103856630 | A | * | 6/2014 | ........... G06F 3/0482 |
| CN | 103856630 | A | | 6/2014 | |
| CN | 104716993 | A | | 6/2015 | |
| CN | 104716993 | A | * | 6/2015 | ............. H04W 4/80 |
| CN | 104768125 | A | | 7/2015 | |
| CN | 104967971 | A | | 10/2015 | |
| CN | 105846863 | A | | 8/2016 | |
| CN | 106412656 | A | | 2/2017 | |
| CN | 106851530 | A | | 6/2017 | |
| CN | 107135476 | A | | 9/2017 | |
| CN | 107197346 | A | | 9/2017 | |
| CN | 107257540 | A | | 10/2017 | |
| CN | 107371120 | A | | 11/2017 | |
| EP | 2809095 | B1 | * | 9/2016 | ........... H04W 8/005 |
| EP | 2587868 | B1 | * | 12/2022 | ............. H04W 4/80 |
| KR | 20100133512 | A | | 12/2010 | |
| WO | WO-2016080798 | A1 | * | 5/2016 | |
| WO | 2016127138 | A1 | | 8/2016 | |
| WO | 2017003337 | A1 | | 1/2017 | |

* cited by examiner

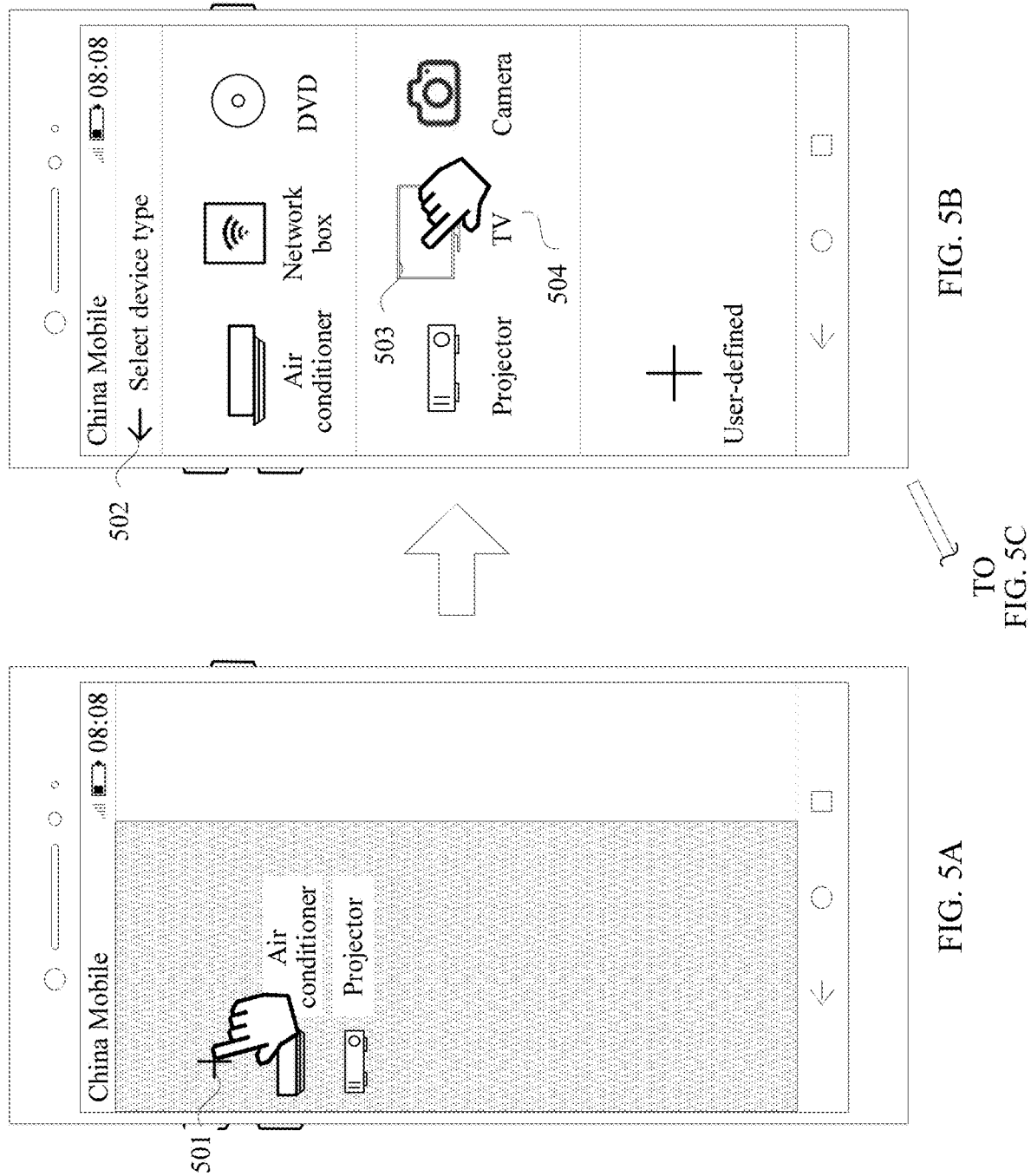

First byte  Second byte  Third byte to eighth byte

BLUETOOTH COMMUNICATION METHOD AND DUAL-MODE BLUETOOTH TERMINAL

CROSS-REFERENCE TO RELATED APPLICATIONS

This application is a U.S. National Stage of International Patent Application No. PCT/CN2018/098123 filed on Aug. 1, 2018, which is hereby incorporated by reference in its entirety.

TECHNICAL FIELD

Embodiments of this application relate to the terminal field, and in particular, to a Bluetooth communication method and a dual-mode Bluetooth terminal.

BACKGROUND

With continuous progress of science and technology and continuous improvement of people's living standards, household appliances such as televisions have become necessities for people's life. For ease of control, most household appliances are equipped with remote controllers for wireless control on the household appliances, to provide convenient control experience for a user. Currently, infrared remote controllers are widely used for many household appliances because of significant advantages such as a strong anti-interference capability, high information transmission reliability, low power consumption, and easy realization. However, infrared control has the following disadvantages a control distance is short, an obstacle cannot be penetrated, an infrared signal needs to point at a controlled device to implement control, and the like. Therefore, the infrared control cannot meet a household appliance control requirement.

In addition, with progress of society, terminals such as mobile phones have basically become indispensable articles in people's daily life. A current development trend is to use a terminal such as a mobile phone to control a household appliance through Bluetooth. However, when the terminal is used to control the household appliance through Bluetooth, if the terminal is disconnected from the household appliance because a user leaves home or due to another reason, automatic reconnection cannot be implemented between the terminal and the household appliance when the user expects to use the terminal to control the household appliance through Bluetooth again. Consequently, a reconnection process is relatively complex and consumes a relatively long time.

SUMMARY

Embodiments of this application provide a Bluetooth communication method and a dual-mode Bluetooth terminal, to resolve a problem that automatic reconnection cannot be implemented between a terminal and a household appliance, and a reconnection process is relatively complex and consumes a relatively long time.

To achieve the foregoing objective, the following technical solutions are used in the embodiments of this application.

According to a first aspect of the embodiments of this application, a Bluetooth communication method is provided. The method may include: receiving, by a first dual-mode Bluetooth terminal, first input of a user; sending, by the first dual-mode Bluetooth terminal, a first BLE pairing advertisement message in response to the first input, where an address type in the first BLE pairing advertisement message is public public, an advertisement address in the first BLE pairing advertisement message is a fixed advertisement address, and the first BLE pairing advertisement message carries an identifier used to indicate that the first dual-mode Bluetooth terminal does not support BR/EDR; receiving, by the first dual-mode Bluetooth terminal, second input of the user; entering, by the first dual-mode Bluetooth terminal, a conventional Bluetooth discoverable mode in response to the second input; receiving a paging message; and sending, by the first dual-mode Bluetooth terminal, a paging response in response to the received paging message, where the paging response carries a MAC address of the first dual-mode Bluetooth terminal, and the first input is different from the second input.

According to the Bluetooth communication method provided in the embodiments of this application, after receiving the first input of the user, the first dual-mode Bluetooth terminal sends the first BLE pairing advertisement message, so that a second terminal establishes a BLE connection to the first dual-mode Bluetooth terminal, and a Bluetooth remote controller can be created based on the established BLE connection. In this way, the first dual-mode Bluetooth terminal such as a mobile phone controls the second terminal based on BLE. In addition, a maximum transmission distance of a Bluetooth signal may reach hundreds of meters, and the Bluetooth signal can be sent to a peer end in any direction within the transmission distance, and is not affected by an obstacle. Therefore, control implemented by the first dual-mode Bluetooth terminal on the second terminal based on BLE can better meet a control requirement of a user for the second terminal. Moreover, the first BLE pairing advertisement message including the fixed advertisement address is sent, so that automatic reconnection can be implemented between the first dual-mode Bluetooth terminal and the second terminal. In this way, a reconnection time is shortened, a reconnection process is simplified, and user experience is improved. Further, the first dual-mode Bluetooth terminal may enter the conventional Bluetooth discoverable mode after receiving the second input, so that the first dual-mode Bluetooth terminal can establish a conventional Bluetooth connection to the second terminal to transmit file data such as audio and a video, thereby meeting various data transmission requirements of the user.

According to a second aspect of the embodiments of this application, a Bluetooth communication method is provided. The method may include: receiving, by a first dual-mode Bluetooth terminal, first input of a user; sending, by the first dual-mode Bluetooth terminal, a first BLE pairing advertisement message in response to the received first input, where an address type in the first BLE pairing advertisement message is public public, an advertisement address in the first BLE pairing advertisement message is a fixed advertisement address, and the first BLE pairing advertisement message carries an identifier used to indicate that the first dual-mode Bluetooth terminal does not support BR/EDR; receiving, by the first dual-mode Bluetooth terminal, second input of the user; and sending, by the first dual-mode Bluetooth terminal, a second BLE pairing advertisement message in response to the second input, where an address type in the second BLE pairing advertisement message is random random, an advertisement address in the second BLE pairing advertisement message is a random advertisement address, and the second BLE pairing advertisement message carries an identifier used to indicate that the first dual-mode Bluetooth terminal supports BR/EDR.

According to the Bluetooth communication method provided in the embodiments of this application, after receiving the first input of the user, the first dual-mode Bluetooth terminal sends the first BLE pairing advertisement message, so that a second terminal establishes a BLE connection to the first dual-mode Bluetooth terminal, and a Bluetooth remote controller can be created based on the established BLE connection. In this way, the first dual-mode Bluetooth terminal such as a mobile phone controls the second terminal based on BLE. In addition, a maximum transmission distance of a Bluetooth signal may reach hundreds of meters, and the Bluetooth signal can be sent to a peer end in any direction within the transmission distance, and is not affected by an obstacle. Therefore, control implemented by the first dual-mode Bluetooth terminal on the second terminal based on BLE can better meet a control requirement of a user for the second terminal. Moreover, the first BLE pairing advertisement message including the fixed advertisement address is sent, so that automatic reconnection can be implemented between the first dual-mode Bluetooth terminal and the second terminal. In this way, a reconnection time is shortened, a reconnection process is simplified, and user experience is improved. Further, the first dual-mode Bluetooth terminal may send the second BLE pairing advertisement message in response to the second input, to establish a BLE connection to another device. This ensures security when BLE is used in another scenario.

With reference to the first aspect, in a possible implementation, the Bluetooth communication method may further include: sending, by the first dual-mode Bluetooth terminal, a second BLE pairing advertisement message in response to the received second input, where an address type in the second BLE pairing advertisement message is random random, an advertisement address in the second BLE pairing advertisement message is a random advertisement address, and the second BLE pairing advertisement message carries an identifier used to indicate that the first dual-mode Bluetooth terminal supports BR/EDR. In this way, the first dual-mode Bluetooth terminal may send the second BLE pairing advertisement message in response to the second input, to establish a BLE connection to another device. This ensures security when BLE is used in another scenario.

With reference to the first aspect or the possible implementation of the first aspect, in another possible implementation, or with reference to the second aspect, in a possible implementation, the first input may be input for creating a Bluetooth remote controller or enabling a Bluetooth remote controller.

With reference to the first aspect or the possible implementations of the first aspect or with reference to the second aspect or the possible implementation of the second aspect, in another possible implementation, the fixed advertisement address may be the MAC address of the first dual-mode Bluetooth terminal, or may be a randomly generated fixed address, or may be a fixed address obtained according to a preset formula or table.

With reference to the first aspect or the possible implementations of the first aspect or with reference to the second aspect or the possible implementations of the second aspect, in another possible implementation, after the sending, by the first dual-mode Bluetooth terminal, a first BLE pairing advertisement message, the Bluetooth communication method may further include: detecting, by a second terminal, the first BLE pairing advertisement message, and when determining that the fixed advertisement address carried in the first BLE pairing advertisement message is not locally stored, sending a pairing request, and storing the received fixed advertisement address; receiving, by the first dual-mode Bluetooth terminal, the pairing request from the second terminal; displaying, by the first dual-mode Bluetooth terminal, a pairing window in response to the received pairing request; receiving, by the first dual-mode Bluetooth terminal, a pairing code entered by the user in the pairing window; sending, by the first dual-mode Bluetooth terminal, a pairing response to the second terminal, where the pairing response includes the pairing code entered by the user; and establishing, by the first dual-mode Bluetooth terminal, a BLE connection to the second terminal after verification on the pairing code succeeds. After the second terminal detects the first BLE pairing advertisement message, if the fixed advertisement address carried in the first BLE pairing advertisement message is not locally stored, the second terminal sends the pairing request to request the user to enter the pairing code, and establishes the BLE connection to the first dual-mode Bluetooth terminal after verification on the pairing code succeeds. In this way, pairing and connection between the first dual-mode Bluetooth terminal and the second terminal are implemented.

With reference to the first aspect or the possible implementations of the first aspect or with reference to the second aspect or the possible implementations of the second aspect, in another possible implementation, after the sending, by the first dual-mode Bluetooth terminal, a first BLE pairing advertisement message, the Bluetooth communication method may further include: detecting, by a second terminal, the first BLE pairing advertisement message, and when determining that the fixed advertisement address carried in the first BLE pairing advertisement message is locally stored, automatically establishing a BLE connection to the first dual-mode Bluetooth terminal. After the second terminal detects the first BLE pairing advertisement message, if the fixed advertisement address carried in the first BLE pairing advertisement message is locally stored, the second terminal automatically establishes the BLE connection to the first dual-mode Bluetooth terminal. This simplifies a reconnection process and shortens a reconnection time.

With reference to the first aspect or the possible implementations of the first aspect or with reference to the second aspect or the possible implementations of the second aspect, in another possible implementation, the sending, by the first dual-mode Bluetooth terminal, a first BLE pairing advertisement message in response to the first input, where an address type in the first BLE pairing advertisement message is public public, an advertisement address in the first BLE pairing advertisement message is a fixed advertisement address, and the first BLE pairing advertisement message carries an identifier used to indicate that the first dual-mode Bluetooth terminal does not support BR/EDR may specifically include: modifying, by the first dual-mode Bluetooth terminal, an advertisement address in a BLE advertisement message from a random advertisement address to the fixed advertisement address, modifying an address type in the BLE advertisement message from random random to public public, and modifying an identifier in the BLE advertisement message from a first value to a second value, in response to the first input of the user, to generate the first BLE pairing advertisement message, where the first value is used to indicate that the first dual-mode Bluetooth terminal supports BR/EDR, and the second value is used to indicate that the first dual-mode Bluetooth terminal does not support BR/EDR; and sending, by the first dual-mode Bluetooth terminal, the generated first BLE pairing advertisement message. The first BLE pairing advertisement message is generated by modifying the BLE advertisement message. In addition, a value of the identifier in the BLE advertisement message is modified from the first value to the second value, where the first value is used to indicate that the first dual-mode Bluetooth terminal supports BR/EDR, and the second value is used to indicate that the first dual-mode Bluetooth terminal does not support BR/EDR. This avoids a problem that pairing and connection fail because the second terminal and the first dual-mode Bluetooth terminal perform pairing and connection through conventional Bluetooth.

With reference to the first aspect or the possible implementations of the first aspect or with reference to the second aspect or the possible implementations of the second aspect, in another possible implementation, the modifying, by the first dual-mode Bluetooth terminal, an advertisement address in a BLE advertisement message from a random advertisement address to the fixed advertisement address, modifying an address type in the BLE advertisement message from random random to public public, and modifying an identifier in the BLE advertisement message from a first value to a second value, in response to the first input, to generate the first BLE pairing advertisement message may specifically include: invoking, by the first dual-mode Bluetooth terminal, a BLE advertisement interface, generating the BLE advertisement message, modifying the advertisement address in the BLE advertisement message from the random advertisement address to the fixed advertisement address, modifying the address type in the BLE advertisement message from random random to public public, and modifying the identifier in the BLE advertisement message from the first value to the second value, in response to the first input, to generate the first BLE pairing advertisement message. A newly added BLE advertisement interface is invoked to generate and send the first BLE pairing advertisement message, and a native BLE advertisement interface is retained. This not only ensures security when another application uses BLE, but also ensures that automatic reconnection can be implemented between the first dual-mode Bluetooth terminal and the second terminal.

With reference to the first aspect or the possible implementations of the first aspect or with reference to the second aspect or the possible implementations of the second aspect, in another possible implementation, the Bluetooth communication method may further include: if the first dual-mode Bluetooth terminal fails to establish the BLE connection within a preset time period after sending the first BLE pairing advertisement message, stopping, by the first dual-mode Bluetooth terminal, sending the first BLE pairing advertisement message. If the first dual-mode Bluetooth terminal fails to establish the BLE connection within the preset time period after sending the first BLE pairing advertisement message, the first dual-mode Bluetooth terminal stops sending the first BLE pairing advertisement message. This avoids a problem that the fixed advertisement address in the first BLE pairing advertisement message is exposed to the outside for a long time, and another device easily obtains the address.

With reference to the first aspect or the possible implementations of the first aspect or with reference to the second aspect or the possible implementations of the second aspect, in another possible implementation, the invoking, by the first dual-mode Bluetooth terminal, a BLE advertisement interface, generating the BLE advertisement message, modifying the advertisement address in the BLE advertisement message from the random advertisement address to the fixed advertisement address, modifying the address type in the BLE advertisement message from random random to public public, and modifying the identifier in the BLE advertisement message from the first value to the second value, in response to the first input, to generate the first BLE pairing advertisement message may specifically include: in response to the first input of the user, determining, by the first dual-mode Bluetooth terminal, that an application invoking the BLE advertisement interface is a first application, where the first application is an application that has permission to invoke the BLE advertisement interface; and invoking, by the first dual-mode Bluetooth terminal, the BLE advertisement interface, generating the BLE advertisement message, modifying the advertisement address in the BLE advertisement message from the random advertisement address to the fixed advertisement address, modifying the address type in the BLE advertisement message from random to public public, and modifying the identifier in the BLE advertisement message from the first value to the second value, to generate the first BLE pairing advertisement message. Only the application that has the permission to invoke the BLE advertisement interface is allowed to invoke the newly added BLE advertisement interface. This ensures device security.

With reference to the first aspect or the possible implementations of the first aspect or with reference to the second aspect or the possible implementations of the second aspect, in another possible implementation, the fixed advertisement address may be modified from a first fixed address to a second fixed address after a predetermined time period. The fixed advertisement address is periodically updated to ensure device security.

With reference to the first aspect or the possible implementations of the first aspect or with reference to the second aspect or the possible implementations of the second aspect, in another possible implementation, the second input may be input for enabling a Bluetooth function of the first dual-mode Bluetooth terminal.

According to a third aspect of the embodiments of this application, a dual-mode Bluetooth terminal is provided. The dual-mode Bluetooth terminal may include: an input unit, configured to receive first input of a user; a sending unit, configured to send a first BLE pairing advertisement message in response to the first input received by the input unit, where an address type in the first BLE pairing advertisement message is public public, an advertisement address in the first BLE pairing advertisement message is a fixed advertisement address, and the first BLE pairing advertisement message carries an identifier used to indicate that the dual-mode Bluetooth terminal does not support BR/EDR, where the input unit is further configured to receive second input of the user; a processing unit, configured to enter a conventional Bluetooth discoverable mode in response to the second input received by the input unit; and a receiving unit, configured to receive a paging message, where the sending unit is further configured to send a paging response in response to the paging message received by the receiving unit, where the paging response carries a MAC address of the dual-mode Bluetooth terminal, and the first input is different from the second input.

According to a fourth aspect of the embodiments of this application, a dual-mode Bluetooth terminal is provided. The dual-mode Bluetooth terminal may include: an input unit, configured to receive first input of a user; and a sending unit, configured to send a first BLE pairing advertisement message in response to the first input received by the input unit, where an address type in the first BLE pairing advertisement message is public public, an advertisement address in the first BLE pairing advertisement message is a fixed advertisement address, and the first BLE pairing advertisement message carries an identifier used to indicate that the dual-mode Bluetooth terminal does not support BR/EDR, where the input unit is further configured to receive second input of the user; and the sending unit is further configured to send a second BLE pairing advertisement message in response to the second input received by the input unit, where an address type in the second BLE pairing advertisement message is random random, an advertisement address in the second BLE pairing advertisement message is a random advertisement address, and the second BLE pairing advertisement message carries an identifier used to indicate that the dual-mode Bluetooth terminal supports BR/EDR.

With reference to the third aspect, in a possible implementation, the sending unit may be further configured to send a second BLE pairing advertisement message in response to the second input received by the input unit, where an address type in the second BLE pairing advertisement message is random random, an advertisement address in the second BLE pairing advertisement message is a random advertisement address, and the second BLE pairing advertisement message carries an identifier used to indicate that the dual-mode Bluetooth terminal supports BR/EDR.

With reference to the third aspect or the foregoing possible implementation, in another possible implementation, or with reference to the fourth aspect, in a possible implementation, the first input may be input for creating a Bluetooth remote controller or enabling a Bluetooth remote controller.

With reference to the third aspect or the foregoing possible implementations or with reference to the fourth aspect or the foregoing possible implementation, in another possible implementation, the fixed advertisement address may be the MAC address of the dual-mode Bluetooth terminal.

With reference to the third aspect or the foregoing possible implementations or with reference to the fourth aspect or the foregoing possible implementations, in another possible implementation, the sending unit may be specifically configured to: modify an advertisement address in a BLE advertisement message from a random advertisement address to the fixed advertisement address, modify an address type in the BLE advertisement message from random random to public public, and modify an identifier in the BLE advertisement message from a first value to a second value, in response to the first input, to generate the first BLE pairing advertisement message, where the first value is used to indicate that the dual-mode Bluetooth terminal supports BR/EDR, and the second value is used to indicate that the dual-mode Bluetooth terminal does not support BR/EDR; and send the first BLE pairing advertisement message.

With reference to the third aspect or the foregoing possible implementations or with reference to the fourth aspect or the foregoing possible implementations, in another possible implementation, the sending unit may be specifically configured to: invoke a BLE advertisement interface, generate the BLE advertisement message, modify the advertisement address in the BLE advertisement message from the random advertisement address to the fixed advertisement address, modify the address type in the BLE advertisement message from random random to public public, and modify the identifier in the BLE advertisement message from the first value to the second value, in response to the first input, to generate the first BLE pairing advertisement message; and send the first BLE pairing advertisement message.

With reference to the third aspect or the foregoing possible implementations or with reference to the fourth aspect or the foregoing possible implementations, in another possible implementation, the sending unit may be further configured to: if a BLE connection fails to be established within a preset time period after the first BLE pairing advertisement message is sent, stop sending the first BLE pairing advertisement message.

With reference to the third aspect or the foregoing possible implementations or with reference to the fourth aspect or the foregoing possible implementations, in another possible implementation, the sending unit may be specifically configured to: in response to the first input, determine that an application invoking the BLE advertisement interface is a first application, where the first application is an application that has permission to invoke the BLE advertisement interface; invoke the BLE advertisement interface, generate the BLE advertisement message, modify the advertisement address in the BLE advertisement message from the random advertisement address to the fixed advertisement address, modify the address type in the BLE advertisement message from random to public public, and modify the identifier in the BLE advertisement message from the first value to the second value, to generate the first BLE pairing advertisement message; and send the first BLE pairing advertisement message.

With reference to the third aspect or the foregoing possible implementations or with reference to the fourth aspect or the foregoing possible implementations, in another possible implementation, the fixed advertisement address may be modified from a first fixed address to a second fixed address after a predetermined time period.

With reference to the third aspect or the foregoing possible implementations or with reference to the fourth aspect or the foregoing possible implementations, in another possible implementation, the second input may be input for enabling a Bluetooth function of the dual-mode Bluetooth terminal.

According to a fifth aspect of the embodiments of this application, a dual-mode Bluetooth terminal is provided. The dual-mode Bluetooth terminal may include one or more processors, a memory, a touchscreen, and one or more computer programs. The one or more processors, the memory, the touchscreen, and the one or more computer programs are connected by using one or more communications buses. The touchscreen may include a touch surface and a display. The one or more computer programs are stored in the memory and are configured to be executed by the one or more processors. The one or more computer programs include an instruction, and the instruction may be used to perform the Bluetooth communication method according to any one of the first aspect or the possible implementations of the first aspect, or any one of the second aspect or the possible implementations of the second aspect.

According to a sixth aspect of the embodiments of this application, a computer storage medium is provided. The computer storage medium may include a computer instruction, and when the computer instruction is run on a dual-mode Bluetooth terminal, the dual-mode Bluetooth terminal is enabled to perform the Bluetooth communication method according to any one of the first aspect or the possible implementations of the first aspect, or any one of the second aspect or the possible implementations of the second aspect.

According to a seventh aspect of the embodiments of this application, a computer program product is provided. When the computer program product is run on a computer, the computer is enabled to perform the Bluetooth communication method according to any one of the first aspect or the possible implementations of the first aspect, or any one of the second aspect or the possible implementations of the second aspect.

According to an eighth aspect of the embodiments of this application, a Bluetooth communications apparatus is provided. The apparatus has a function of implementing behavior of the dual-mode Bluetooth terminal in the method according to the first aspect or the second aspect. The function may be implemented by hardware, or may be implemented by hardware executing corresponding software. The hardware or software includes one or more modules corresponding to the foregoing function.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

BRIEF DESCRIPTION OF DRAWINGS

FIG. 5A to FIG. 5D are a schematic diagram of some graphical user interfaces displayed on a first dual-mode Bluetooth terminal according to some embodiments of this application;

DESCRIPTION OF EMBODIMENTS

Figure 1:
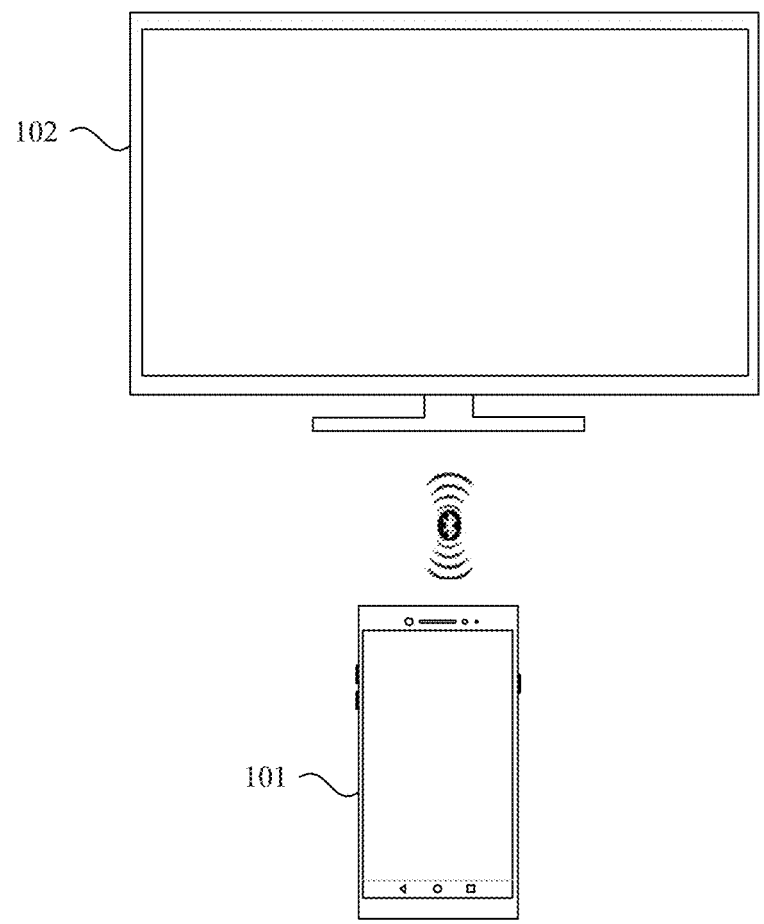
FIG. 1 is a simplified schematic diagram of a system architecture according to an embodiment of this application.

It should be understood that the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

In the embodiments of this application, the word "example", "for example", or the like is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example", or the like is intended to present a related concept in a specific manner.

An embodiment of this application provides a Bluetooth communication method. The method may be applied to a dual-mode Bluetooth terminal that supports both conventional Bluetooth and Bluetooth low energy (Bluetooth Low Energy, BLE). In the Bluetooth communication method, a first dual-mode Bluetooth terminal such as a mobile phone may control a second terminal (such as a household appliance) based on BLE. In addition, a maximum transmission distance of a Bluetooth signal may reach hundreds of meters, and the Bluetooth signal can be sent to a peer end in any direction within the transmission distance, and is not affected by an obstacle. Therefore, control implemented by the first dual-mode Bluetooth terminal on the second terminal based on BLE can better meet a control requirement of a user for the second terminal. Moreover, if the first dual-mode Bluetooth terminal performs pairing and connection with the second terminal through a BLE pairing advertisement message provided in the prior art, because an advertisement address carried in the BLE pairing advertisement message is a randomly generated random advertisement address and changes every 15 minutes, after the first dual-mode Bluetooth terminal is disconnected from the second terminal, when there is a reconnection requirement, an advertisement address in a BLE pairing advertisement message resent by the first dual-mode Bluetooth terminal is inconsistent with an advertisement address used during previous connection establishment, and automatic reconnection cannot be implemented between the first dual-mode Bluetooth terminal and the second terminal. However, in the Bluetooth communication method provided in this embodiment of this application, a BLE pairing advertisement message including a fixed advertisement address is sent, so that automatic reconnection can be implemented between the first dual-mode Bluetooth terminal and the second terminal. In this way, a reconnection time is shortened, a reconnection process is simplified, and user experience is improved.

FIG. 1 is a simplified schematic diagram of a system architecture to which the foregoing Bluetooth communication method may be applied according to an embodiment of this application. As shown in FIG. 1, the system architecture may include a first dual-mode Bluetooth terminal 101 and a second terminal 102.

The first dual-mode Bluetooth terminal 101 supports both conventional Bluetooth and BLE. The second terminal 102 supports BLE. Optionally, the second terminal 102 may also support the conventional Bluetooth. The conventional Bluetooth may be Bluetooth basic rate (Basic Rate, BR), or may be Bluetooth enhanced data rate (Enhanced Data Rate, EDR).

The first dual-mode Bluetooth terminal 101 and the second terminal 102 may establish a wireless connection based on BLE, to implement short-distance communication. For example, the first dual-mode Bluetooth terminal 101 controls the second terminal 102 based on the established BLE connection.

In specific implementation, the first dual-mode Bluetooth terminal 101 may be a mobile phone, a tablet computer, a desktop computer, a laptop computer, a handheld computer, a notebook computer, an ultra-mobile personal computer (Ultra-mobile Personal Computer, UMPC), a netbook, a cellular phone, a personal digital assistant (Personal Digital Assistant, PDA), or the like. In an example, FIG. 1 shows an example in which the first dual-mode Bluetooth terminal 101 is a mobile phone.

The second terminal 102 may be a household device having a relatively complex control function, such as a television, a network box, a set-top box, an air conditioner, a refrigerator, a washing machine, or a water dispenser, or may be an intelligent device having only a switch or only a limited control function, such as a light, a fan, a Bluetooth sound box, or a curtain, or may be a device such as a key, a sweeping robot, a Bluetooth headset, smart glasses, a smartwatch, a smart band, or a smart wrist strap for which a user has a positioning requirement. In an example, FIG. 1 shows an example in which the second terminal 102 is a television.

Figure 2:
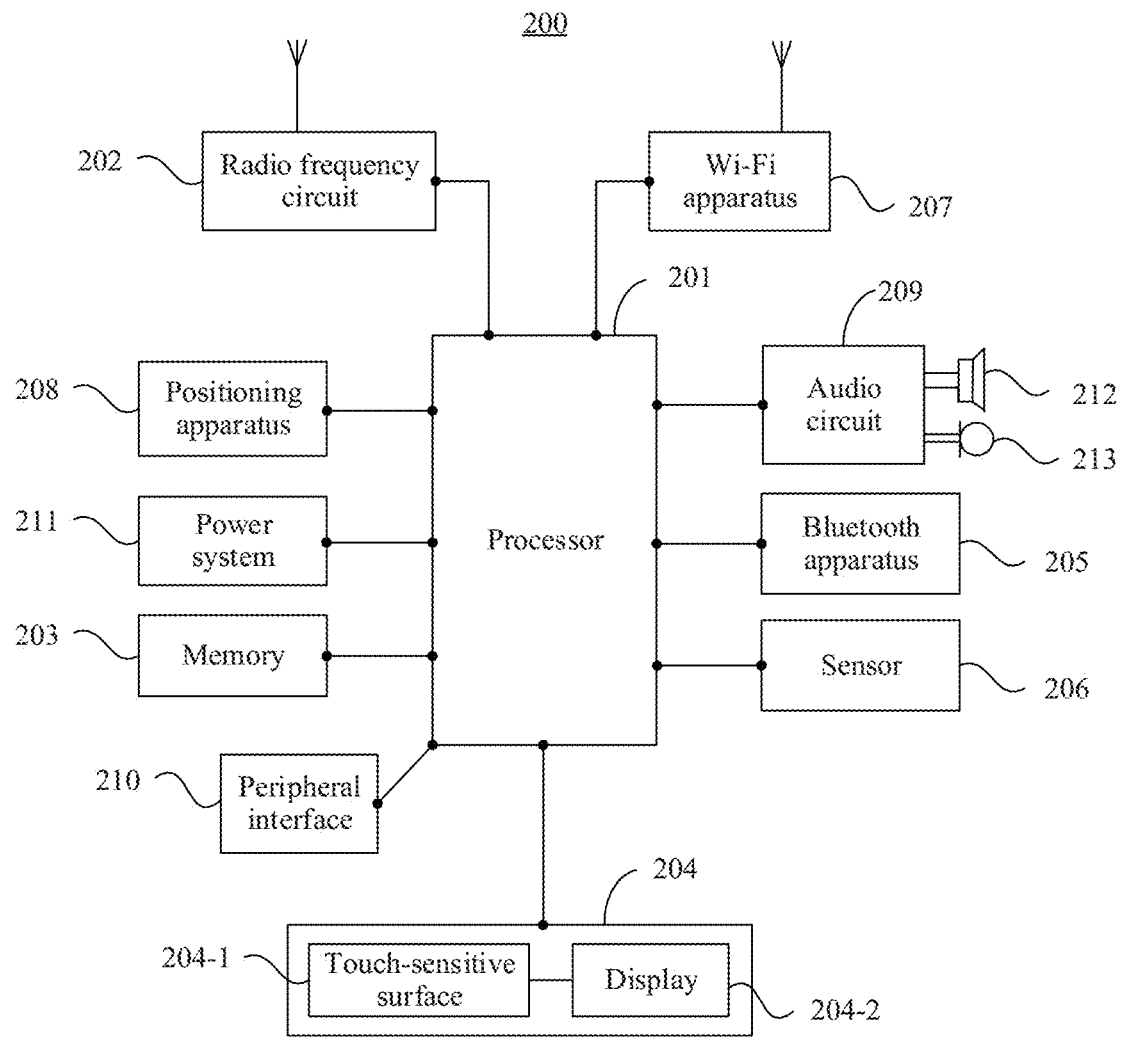
FIG. 2 is a schematic diagram of a hardware structure of a mobile phone 200 according to an embodiment of this application.

When the first dual-mode Bluetooth terminal 101 is the mobile phone, referring to FIG. 2, an example in which the first dual-mode Bluetooth terminal is a mobile phone 200 is used in this embodiment of this application to describe the first dual-mode Bluetooth terminal provided in this embodiment of this application. A person skilled in the art may understand that the mobile phone 200 shown in FIG. 2 is merely an example, and does not constitute a limitation on the mobile phone 200. In addition, the mobile phone 200 may have more or fewer components than those shown in the figure, or may combine two or more components, or may have different component configurations. The components shown in FIG. 2 may be implemented in hardware including one or more signal processing and/or application-specific integrated circuits, software, or a combination of hardware and software.

As shown in FIG. 2, the mobile phone 200 may specifically include components such as a processor 201, a radio frequency (Radio Frequency, RF) circuit 202, a memory 203, a touchscreen 204, a Bluetooth apparatus 205, one or more sensors 206, a wireless fidelity (Wireless Fidelity, Wi-Fi) apparatus 207, a positioning apparatus 208, an audio circuit 209, a peripheral interface 210, and a power system 211. These components may perform communication by using one or more communications buses or signal cables (not shown in FIG. 2).

The following describes the components of the mobile phone 200 in detail with reference to FIG. 2.

The processor 201 is a control center of the mobile phone 200. The processor 201 is connected to parts of the mobile phone 200 by using various interfaces and cables, and performs various functions of the mobile phone 200 and data processing by running or executing an application (Application, App) program stored in the memory 203, and invoking data and an instruction that are stored in the memory 203. In some embodiments, the processor 201 may include one or more processing units. The processor 201 may further integrate an application processor and a modem processor. The application processor mainly processes an operating system, a user interface, an application program, and the like. The modem processor mainly processes wireless communication. It should be understood that the modem processor may alternatively not be integrated into the processor 201. For example, the processor 201 may be a Kirin 970 chip manufactured by Huawei.

The radio frequency circuit 202 may be configured to receive and send a wireless signal in an information receiving and sending process or a call process. Particularly, after receiving downlink data from a base station, the radio frequency circuit 202 may send the downlink data to the processor 201 for processing. In addition, the radio frequency circuit 202 sends related uplink data to the base station. Usually, the radio frequency circuit 202 includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 203 is configured to store the application program and the data. The processor 201 runs the application program and the data that are stored in the memory 203, to perform the various functions of the mobile phone 200 and data processing. The memory 203 mainly includes a program storage area and a data storage area. The program storage area may store the operating system, an application program required by at least one function (for example, a sound playing function and an image playing function), and the like. The data storage area may store data (for example, audio data and a phone book) created based on use of the mobile phone 200. In addition, the memory 203 may include a high-speed random access memory, and may further include a nonvolatile memory such as a magnetic disk storage device, a flash memory device, or another volatile solid-state storage device. The memory 203 may store various operating systems such as an iOS® operating system developed by Apple and an Android® operating system developed by Google.

The touchscreen 204 may include a touch-sensitive surface 204-1 and a display 204-2. The touch-sensitive surface 204-1 (for example, a touch panel) may collect a touch event performed by a user of the mobile phone 200 on or near the touch-sensitive screen 204-1 (for example, an operation performed by the user on the touch-sensitive surface 204-1 or near the touch-sensitive surface 204-1 by using any suitable object such as a finger or a stylus), and send collected touch information to another component, for example, the processor 201. The touch event performed by the user near the touch-sensitive surface 204-1 may be referred to as a floating touch. The floating touch may mean that the user does not need to directly touch a touchpad to select, move, or drag a target (for example, an icon), but the user needs only to be near the mobile phone 200 to implement a desired function. In an application scenario of the floating touch, terms such as "touch" and "contact" do not imply a direct contact with the touchscreen, but a contact near or close to the touchscreen. The touch-sensitive surface 204-1 on which the floating touch can be performed may be implemented in a capacitive type, an infrared light sensing type, an ultrasonic wave type, or the like. The touch-sensitive surface 204-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and sends the touch point coordinates to the processor 201. The touch controller may further receive an instruction sent by the processor 201, and execute the instruction. In addition, the touch-sensitive surface 204-1 may be implemented in a plurality of types such as a resistive type, a capacitive type, an infrared type, or a surface acoustic wave type. The display 204-2 may be configured to display information entered by the user or information provided for the user, and various menus of the mobile phone 200. The display 204-2 may be configured in a form such as a liquid crystal display or an organic light-emitting diode. The touch-sensitive surface 204-1 may cover the display 204-2. After detecting the touch event on or near the touch-sensitive surface 204-1, the touch-sensitive surface 204-1 transmits the touch event to the processor 201 to determine a type of the touch event. Then, the processor 201 may provide corresponding visual output on the display 204-2 based on the type of the touch event. Although in FIG. 2, the touch-sensitive surface 204-1 and the display 204-2 are used as two independent components to implement input and output functions of the mobile phone 200, in some embodiments, the touch-sensitive surface 204-1 and the display 204-2 may be integrated to implement the input and output functions of the mobile phone 200. It may be understood that the touchscreen 204 is formed by stacking a plurality of layers of materials. Only the touch-sensitive surface (layer) and the display (layer) are displayed in this embodiment of this application, and another layer is not recorded in this embodiment of this application. In addition, in some other embodiments of this application, the touch-sensitive surface 204-1 may cover the display 204-2, and a size of the touch-sensitive surface 204-1 is greater than a size of the display 204-2. Therefore, the display 204-2 is completely covered by the touch-sensitive surface 204-1. Alternatively, the touch-sensitive surface 204-1 may be configured on a front side of the mobile phone 200 in a full panel form. In other words, any touch performed by the user on the front side of the mobile phone 200 can be sensed by the mobile phone 200. In this way, full touch control experience on the front side of the mobile phone 200 can be implemented. In some other embodiments, the touch-sensitive surface 204-1 is configured on a front side of the mobile phone 200 in a full panel form, and the display 204-2 may also be configured on the front side of the mobile phone 200 in a full panel form. In this way, a bezel-less structure can be implemented on the front side of the mobile phone 200.

The mobile phone 200 may further include the Bluetooth apparatus 205, configured to implement data exchange between the mobile phone 200 and another short-distance device (for example, a mobile phone, a smartwatch, a television, or a network box). In this embodiment of this application, the Bluetooth apparatus may be an integrated circuit, a Bluetooth chip, or the like.

The mobile phone 200 may further include at least one type of sensor 206, such as a light sensor, a motion sensor, and another sensor. Specifically, the light sensor may include an ambient light sensor and a proximity sensor. The ambient light sensor may adjust luminance of the display of the touchscreen 204 based on ambient light intensity. The proximity sensor may power off the display when the mobile phone 200 is moved to an ear. As one type of the motion sensor, an accelerometer sensor may detect acceleration values in all directions (usually on three axes). The accelerometer sensor may detect a value and a direction of gravity when the accelerometer sensor is stationary, and may be used in an application for recognizing a posture (such as switching between landscape mode and portrait mode, a related game, or magnetometer posture calibration) of the mobile phone 200, a function related to vibration recognition (such as a pedometer or a knock), or the like. For another sensor that may be further configured on the mobile phone 200, such as a gyroscope, a barometer, a hygrometer, a thermometer, or an infrared sensor, details are not described herein.

In the embodiments of this application, the mobile phone 200 may further have a fingerprint recognition function. For example, a fingerprint recognizer may be disposed on a rear side of the mobile phone 200 (for example, below a rear-facing camera), or a fingerprint recognizer may be disposed on the front side of the mobile phone 200 (for example, below the touchscreen 204). Alternatively, a fingerprint recognizer may be configured on the touchscreen 204 to implement the fingerprint recognition function. In other words, the fingerprint recognizer may be integrated with the touchscreen 204 to implement the fingerprint recognition function of the mobile phone 200. In this case, the fingerprint recognizer may be configured on the touchscreen 204 as a part of the touchscreen 204, or may be configured on the touchscreen 204 in another manner. In addition, the fingerprint recognizer may be further implemented as a full-panel fingerprint recognizer. Therefore, the touchscreen 204 may be considered as a panel on which a fingerprint may be collected at any location. The fingerprint recognizer may send a collected fingerprint to the processor 201, so that the processor 201 processes the fingerprint (for example, verify the fingerprint). A main component of the fingerprint recognizer in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

In addition, for a specific technical solution of integrating the fingerprint sensor into the touchscreen in this embodiment of this application, refer to patent application No. US 2015/0036065 A1, entitled "FINGERPRINT SENSOR IN ELECTRONIC DEVICE" and announced by the United States Patent and Trademark Office, and all controls of the apparatus are combined in the embodiments of this application by reference.

The Wi-Fi apparatus 207 is configured to provide the mobile phone 200 with network access that complies with a Wi-Fi related standard or protocol. The mobile phone 200 may access a Wi-Fi access point by using the Wi-Fi apparatus 207, to help the user receive and send emails, browse a web page, access streaming media, and the like. The Wi-Fi apparatus 207 provides wireless broadband internet access for the user. In some other embodiments, the Wi-Fi apparatus 207 may alternatively be used as a Wi-Fi wireless access point, and may provide Wi-Fi network access for another terminal.

The positioning apparatus 208 is configured to provide a geographic location for the mobile phone 200. It may be understood that the positioning apparatus 208 may be specifically a receiver of a positioning system such as a global positioning system (Global Positioning System, GPS) or a BeiDou navigation satellite system. After receiving the geographical location sent by the positioning system, the positioning apparatus 208 sends the information to the processor 201 for processing, or sends the information to the memory 203 for storage. In some other embodiments, the positioning apparatus 208 may alternatively be a receiver of an assisted global positioning system (Assisted Global Positioning System, AGPS). The AGPS runs in a manner in which GPS positioning is performed with specific assistance. By using a signal of a based station together with a GPS satellite signal, the AGPS can speed up positioning performed by the mobile phone 200. In the AGPS system, the positioning apparatus 208 may obtain positioning assistance through communication with an assisted positioning server (for example, a mobile phone positioning server). As an assisted server, the AGPS system assists the positioning apparatus 208 in completing ranging and positioning services. In this case, the assisted positioning server communicates with the positioning apparatus 208 (namely, a GPS receiver) of the first dual-mode Bluetooth terminal such as the mobile phone 200 through a wireless communications network, to provide positioning assistance.

The audio circuit 209, a speaker 212, and a microphone 213 may provide an audio interface between the user and the mobile phone 200. The audio circuit 209 may convert received audio data into an electrical signal and transmit the electrical signal to the speaker 212, and the speaker 212 converts the electrical signal into a sound signal for output. In addition, the microphone 213 converts a collected sound signal into an electrical signal, and the audio circuit 209 receives the electrical signal, converts the electrical signal into audio data, and then outputs the audio data to the RF circuit 202 to send the audio data to, for example, another mobile phone, or outputs the audio data to the memory 203 for further processing.

The peripheral interface 210 is configured to provide various interfaces for an external input/output device (for example, a keyboard, a mouse, an external display, an external memory, or a subscriber identity module card). For example, the peripheral interface 210 is connected to the mouse by using a universal serial bus interface, and the peripheral interface 210 is connected, by using a metal contact on a card slot of the subscriber identity module (Subscriber Identity Module, SIM) card, to the subscriber identity module card provided by a telecommunications operator. The peripheral interface 210 may be configured to couple the external input/output peripheral device to the processor 201 and the memory 203.

The mobile phone 200 may further include the power apparatus 211 (for example, a battery and a power management chip) that supplies power to the components. The battery may be logically connected to the processor 201 through the power management chip, so that functions such as charging management, discharging management, and power consumption management are implemented by using the power apparatus 211.

Although not shown in FIG. 2, the mobile phone 200 may further include a camera (a front-facing camera and/or a rear-facing camera), a flash, a micro projection apparatus, a near field communication (Near Field Communication, NFC) apparatus, and the like. Details are not described herein.

For example, the memory 203 of the mobile phone 200 may store an Android® operating system. The Android® operating system is a Linux-based mobile device operating system, and implements various functions in combination with the foregoing hardware of the mobile phone 200. The following describes a software architecture of the stored Android® operating system in detail. It should be noted that, in this embodiment of this application, the Android® operating system is merely used as an example to describe a software environment required by the first dual-mode Bluetooth terminal to implement the technical solution in this embodiment. A person skilled in the art may understand that this embodiment of this application may alternatively be implemented by using another operating system.

Figure 3:
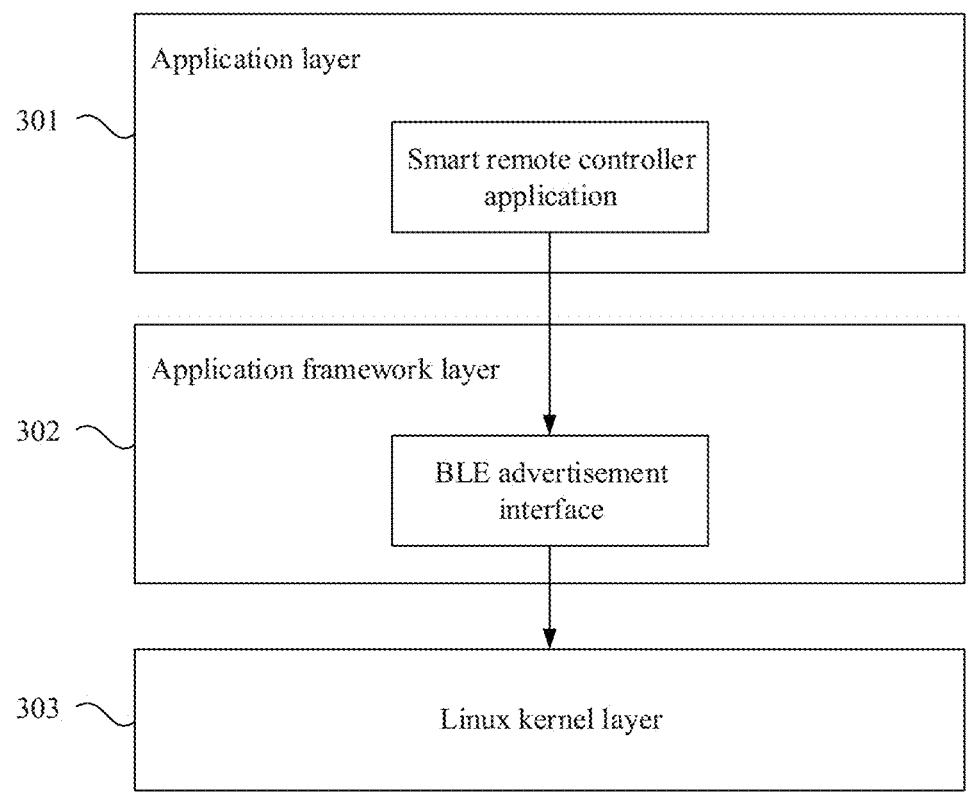
FIG. 3 is a schematic diagram of a software architecture of an Android® operating system that can run on a first dual-mode Bluetooth terminal.

For example, FIG. 3 is a schematic diagram of a software architecture of an Android® operating system that can run on the foregoing first dual-mode Bluetooth terminal. As shown in FIG. 3, the software architecture may be divided into three layers: an application layer 301, an application framework layer 302, and a Linux kernel layer 303.

The application (Applications) layer 301 is an uppermost layer of the operating system, and includes native applications in the operating system, such as an email client, messaging, phone, calendar, browser, and contacts. Certainly, a developer may compile an application and install the application at the layer. The application is usually developed by using a Java language. This is implemented by invoking an application programming interface (Application Programming Interface, API) provided at the application framework layer 302. In some embodiments of this application, the application layer 301 may further include a first application. For example, the first application may be a smart remote controller application. A user may create a smart remote controller of a household device such as a television by using the smart remote controller application. The created smart remote controller can be used to control the household device such as the television. For another example, the first application may be a common remote controller application. The user may create, by using the common remote controller application, a remote controller of an intelligent device such as a light or a fan having only a switch or only a limited control function, for example, a remote controller having only a switch button. The created remote controller can be used to control the intelligent device, for example, to turn on or turn off the light. For another example, the first application may alternatively be a management application of some devices. For example, the user may position, by using the application, a device such as a key or a sweeping robot for which the user has a positioning requirement.

The application framework (Application Framework) layer 302 mainly provides a developer with various APIs that can be used to access applications. The developer may interact with a bottom layer (for example, a Linux kernel) of the operating system by using an application framework, to develop an application of the developer. The application framework mainly includes a series of services and management systems of the Android operating system. In some embodiments of this application, the application framework layer 302 may provide the application layer 301 with a BLE advertisement interface used to send a first BLE pairing advertisement message (an advertisement address in the first BLE pairing advertisement message is a fixed advertisement address, an address type is public public, and the first BLE pairing advertisement message further carries an identifier used to indicate that the first dual-mode Bluetooth terminal does not support BR/EDR). Only the first application included in the application layer 301 is allowed to invoke the BLE advertisement interface, and another application included in the application layer 301 has no permission to invoke the BLE advertisement interface. The application framework layer 302 may further provide the application layer 301 with a native BLE advertisement interface used to send a second BLE pairing advertisement message (an advertisement address in the second BLE pairing advertisement message is a random advertisement address, an address type is random random, and the second BLE pairing advertisement message further carries an identifier used to indicate that the first dual-mode Bluetooth terminal supports BR/EDR).

The Linux kernel (Linux Kernel) layer 303 provides a core system service of the operating system. For example, security, memory management, process management, a network protocol stack, and a driver model are all based on a Linux kernel. The Linux kernel is also used as an abstraction layer between hardware and a software stack. The layer has many drivers related to the first dual-mode Bluetooth terminal, and has the following main drivers: a display driver, a Linux-based frame buffer driver, a keyboard driver that is used as an input device, a flash driver that is based on a memory technology device, a camera driver, an audio driver, a Bluetooth driver, a Wi-Fi driver, and the like. In some embodiments of this application, the Linux kernel layer 303 may be further configured to modify a received BLE advertisement message transmitted by an upper layer, to meet a requirement of a smart remote controller. The Linux kernel layer 303 may further send the modified BLE advertisement message to a second terminal, for example, a television.

All technical solutions in the following embodiments may be implemented in the first dual-mode Bluetooth terminal having the foregoing hardware structure and software architecture.

It should be noted that, for ease of description, in the following embodiments, a Bluetooth communication method provided in the embodiments of this application is described in detail by using an example in which the first dual-mode Bluetooth terminal is a mobile phone, the second terminal is a household device such as a television, and the second terminal may be controlled by creating a smart remote controller of the second terminal on the first dual-mode Bluetooth terminal.

Figure 4:
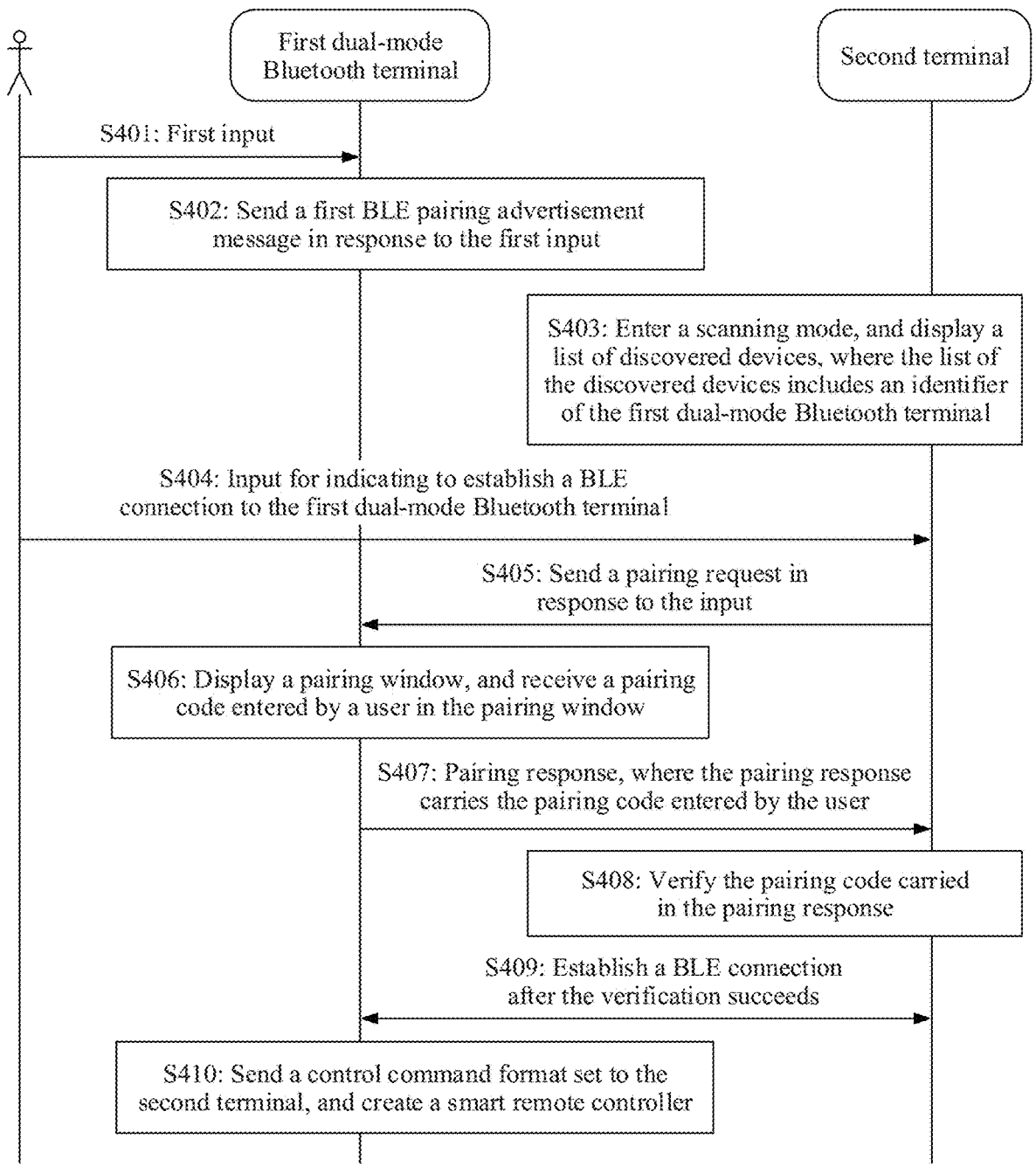
FIG. 4 is a schematic flowchart of a Bluetooth communication method according to an embodiment of this application.

FIG. 4 is a schematic flowchart of a Bluetooth communication method according to an embodiment of this application. As shown in FIG. 4, the method may include S401 to S410.

S401: A first dual-mode Bluetooth terminal receives first input of a user.

The first input may be input for creating a Bluetooth remote controller. For example, the first input may be input for triggering the first dual-mode Bluetooth terminal to create a smart remote controller of a household device such as a television.

For example, in some embodiments of this application, when the user expects to create the smart remote controller of the television on a mobile phone, the user may open a first application such as a smart remote controller application installed on the mobile phone. As shown in FIG. 5(a), the user may perform the first input, for example, perform a tap operation on a remote controller addition button 501, to trigger the mobile phone to create a new smart remote controller in the background. The first input may alternatively be another operation for triggering creation of the smart remote controller of the household device such as the television, for example, voice input, gesture input, or a floating operation. This is not specifically limited in this embodiment of this application.

Figure 5D:
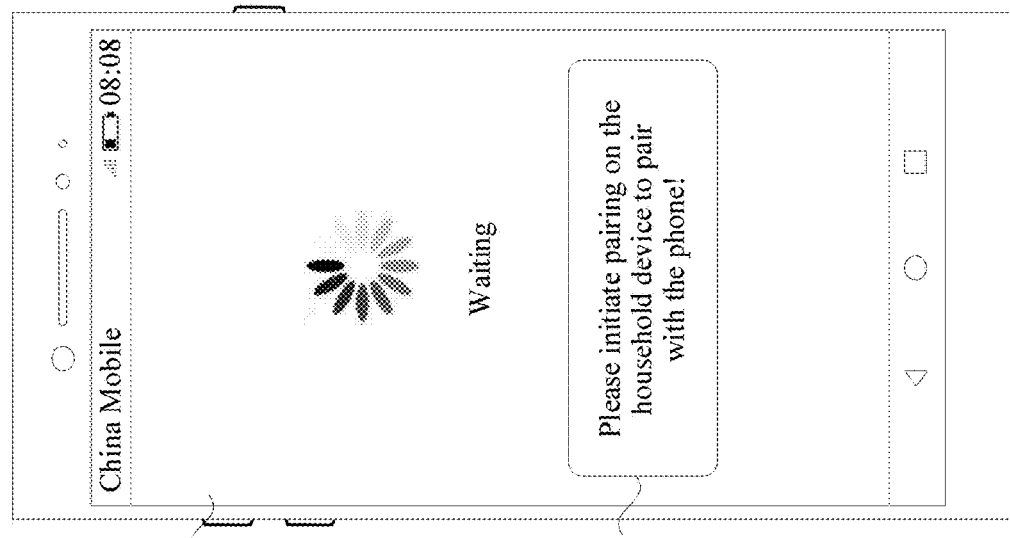
Figure 5C:
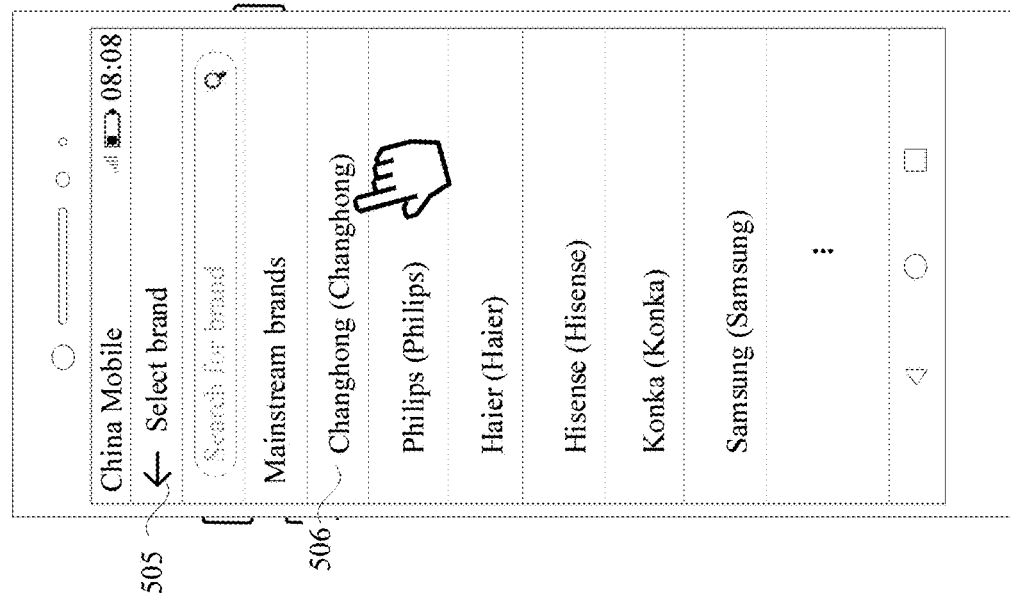

In some other embodiments of this application, the first input may alternatively include a series of operations. For example, the smart remote controller application can support creation of remote controllers of a plurality of different types of household devices, and different types of household devices have different remote controllers. Therefore, as shown in FIG. 5A, the user may first perform the tap operation on the remote controller addition button 501. In response to the tap operation on the remote controller addition button 501, as shown in FIG. 5B, the mobile phone may display a device type selection screen 502. The device type selection screen 502 may include identifiers of various types of household devices for which the smart remote controller application supports creation of remote controllers. For example, as shown in FIG. 5B, the device type selection screen 502 includes an icon 503 and a name 504 of a television, an icon and a name of an air conditioner, an icon and a name of a network box, an icon and a name of a DVD, and the like. Then, the user may perform a tap operation on an identifier such as the icon 503 or the name 504 of the television on the device type selection screen 502, to trigger the mobile phone to create a smart remote controller of the television. In addition, televisions of different brands may have different remote controllers. Therefore, in response to the tap operation performed by the user on the identifier of the television, as shown in FIG. 5C, the mobile phone may further display a brand selection screen 505. The brand selection screen 505 may include identifiers of various types of brands of televisions for which the smart remote controller application supports creation of remote controllers. For example, as shown in FIG. 5C, the brand selection screen 505 includes the following brand names "Changhong" 506, "Philip", "Haier", "Hisense", and the like. The user may perform selection based on a brand of a television of the user. For example, if the brand of the television of the user is "Changhong", the user may perform a tap operation on the brand name "Changhong" 506 on the brand selection screen 505. After the foregoing series of operations, the mobile phone may start to create, in the background, a smart remote controller of the television whose brand is "Changhong".

Optionally, after receiving the first input, the first dual-mode Bluetooth terminal may further display a loading screen in the foreground, to inform the user that a BLE connection between the first dual-mode Bluetooth terminal and a second terminal is being established. For example, as shown in FIG. 5D, the mobile phone may further display a loading screen 507 in the foreground, to inform the user that the smart remote controller is being created. In addition, the loading screen 507 may further include a prompt box 508, which is used to prompt the user to initiate pairing on the second terminal such as the household device (for example, the television).

If the user has created a Bluetooth remote controller, the first input may alternatively be input for enabling the created Bluetooth remote controller when the first dual-mode Bluetooth terminal is disconnected from the second terminal.

In some embodiments of this application, because the first dual-mode Bluetooth terminal establishes a connection to the second terminal and controls the second terminal based on a Bluetooth technology, a Bluetooth function of the first dual-mode Bluetooth terminal needs to be enabled. In specific implementation, the Bluetooth function of the first dual-mode Bluetooth terminal may be automatically enabled when the first dual-mode Bluetooth terminal receives the first input of the user, or may be manually enabled by the user. This is not specifically limited in this embodiment of this application.

An example in which the user has not created a Bluetooth remote controller is used for description in S402 to S410.

S402: The first dual-mode Bluetooth terminal sends a first BLE pairing advertisement message in response to the first input.

The first dual-mode Bluetooth terminal may send the first BLE pairing advertisement message in response to the first input, so that the second terminal can discover the first dual-mode Bluetooth terminal through scanning, and then the first dual-mode Bluetooth terminal can establish a BLE connection to the second terminal.

For example, the first dual-mode Bluetooth terminal may invoke a native BLE advertisement interface to generate and send a BLE pairing advertisement message. In a native BLE design of Google, in consideration of security, an advertisement address included in the BLE pairing advertisement message generated by invoking the native BLE advertisement interface is a random address and changes every 15 minutes. In this case, after the first dual-mode Bluetooth terminal is successfully connected to the second terminal such as the household device by invoking the native BLE advertisement interface, if the first dual-mode Bluetooth terminal is disconnected from the second terminal because the user leaves home or due to another reason, when the first dual-mode Bluetooth terminal expects to reconnect to the second terminal, automatic reconnection cannot be implemented because an advertisement address sent during reconnection is inconsistent with an advertisement address used during previous connection. To be specific, the user needs to re-enter a pairing code, to pair the first dual-mode Bluetooth terminal with the second terminal again. In addition, considering that some applications have no automatic reconnection requirement, in some embodiments of this application, to ensure security when another application uses BLE and ensure that the first dual-mode Bluetooth terminal and the second terminal can be automatically reconnected, the first dual-mode Bluetooth terminal may send the first BLE pairing advertisement message in response to the first input. An advertisement address in the first BLE pairing advertisement message is a fixed advertisement address, an address type is public, and the first BLE pairing advertisement message carries an identifier used to indicate that the first dual-mode Bluetooth terminal does not support BR/EDR. For example, in response to the first input, the first dual-mode Bluetooth terminal may modify an advertisement address in a BLE advertisement message from a random advertisement address to the fixed advertisement address, modify an address type in the BLE advertisement message from random to public, and modify an identifier in the BLE advertisement message from a first value to a second value, to generate and send the first BLE pairing advertisement message, where the first value is used to indicate that the first dual-mode Bluetooth terminal supports BR/EDR, and the second value is used to indicate that the first dual-mode Bluetooth terminal does not support BR/EDR.

In some embodiments of this application, a BLE advertisement interface may be newly added to an application framework layer of the first dual-mode Bluetooth terminal. The first dual-mode Bluetooth terminal may invoke the BLE advertisement interface to generate and send the first BLE pairing advertisement message. A first application in the first dual-mode Bluetooth terminal can invoke the BLE advertisement interface. The first application may be an application that has permission to invoke the BLE advertisement interface, for example, a smart remote controller application.

For example, a specific process in which the first dual-mode Bluetooth terminal invokes the BLE advertisement interface to generate and send the first BLE pairing advertisement message may be as follows: After the first dual-mode Bluetooth terminal receives the first input, the smart remote controller application on the first dual-mode Bluetooth terminal may invoke the BLE advertisement interface at the application framework layer, to generate the BLE advertisement message. The BLE advertisement message may include configuration information such as an advertised connection mode, the advertisement address, the address type, the identifier used to indicate whether BR/EDR is supported, and service information. The advertised connection mode may be a directional connectable mode or a non-directional connectable mode. The advertisement address in the BLE advertisement message is the random advertisement address, which is a randomly generated random address. The address type in the BLE advertisement message is random. A value of the identifier used to indicate whether BR/EDR is supported is the first value, in other words, is used to indicate that the first dual-mode Bluetooth terminal supports BR/EDR. The service information may include a human interface device (Human Interface Device, HID) service and the like. The application framework layer transmits the BLE advertisement message to a bottom layer such as a Linux kernel layer of the first dual-mode Bluetooth terminal. After receiving the BLE advertisement message, the Linux kernel layer may perform the following modification on the BLE advertisement message.

The Linux kernel layer may modify the advertisement address in the BLE advertisement message from the random advertisement address to the fixed advertisement address.

In this embodiment of this application, the fixed advertisement address may be a randomly generated fixed address, and may be stored in the first dual-mode Bluetooth terminal. The fixed address may always remain unchanged, or may be periodically updated, for example, is updated every three days. After the fixed address is updated, the address stored in the first dual-mode Bluetooth terminal also needs to be updated, so that the address can be used when the first dual-mode Bluetooth terminal subsequently reconnects to the second terminal. Alternatively, the fixed advertisement address may be a fixed address obtained by the first dual-mode Bluetooth terminal according to a preset formula or table when the first dual-mode Bluetooth terminal establishes a BLE connection to the second terminal. The first dual-mode Bluetooth terminal may obtain the fixed address according to the preset formula or table when the first dual-mode Bluetooth terminal subsequently reconnects to the second terminal. Alternatively, the fixed advertisement address may be a unique media access control (media access control, MAC) address of the first dual-mode Bluetooth terminal. The MAC address is a MAC address of a Bluetooth module. When the fixed advertisement address may be periodically updated, for example, the fixed advertisement address is modified from a first fixed address to a second fixed address after a predetermined time period (the predetermined time period may be pre-configured, or may be set by the user, for example, three days or five days), if the first dual-mode Bluetooth terminal has established a BLE connection to the second terminal by using the first fixed address, after the fixed advertisement address is modified from the first fixed address to the second fixed address, the first dual-mode Bluetooth terminal needs to reestablish a BLE connection to the second terminal by using the second fixed address. To be specific, after the fixed advertisement address is modified from the first fixed address to the second fixed address, the first dual-mode Bluetooth terminal may reestablish a BLE connection to the second terminal according to a process from S402 to S409. For example, the user needs to manually perform a tap operation on the second terminal to initiate pairing, and the user needs to enter a pairing code on the first dual-mode Bluetooth terminal.

The Linux kernel layer may further modify the address type in the BLE advertisement message from random to public.

In addition, the first dual-mode Bluetooth terminal is a dual-mode device that supports two modes: conventional Bluetooth and BLE, and in this embodiment of this application, the first dual-mode Bluetooth terminal performs pairing and connection with the second terminal such as the household device based on BLE. Therefore, to avoid a case in which pairing and connection fail because the second terminal and the first dual-mode Bluetooth terminal perform pairing and connection through the conventional Bluetooth, the Linux kernel layer may further modify the value of the identifier in the BLE advertisement message from the first value (the first value is used to indicate that the first dual-mode Bluetooth terminal supports BR/EDR, that is, indicate that the first dual-mode Bluetooth terminal is the dual-mode device that supports both the conventional Bluetooth and the BLE) to the second value. The second value is used to indicate that the first dual-mode Bluetooth terminal does not support BR/EDR, that is, the first dual-mode Bluetooth terminal is a single-mode device that supports only BLE. Specifically, a value of "BR/EDR not supported" in a flag field may be modified from "NO" to "YES". In this case, the first dual-mode Bluetooth terminal serves as a single-mode device. To be specific, the first dual-mode Bluetooth terminal supports only BLE, and does not support the conventional Bluetooth.

After performing the foregoing modification on the BLE advertisement message, the Linux kernel layer may obtain the first BLE pairing advertisement message, and send the first BLE pairing advertisement message.

S403: The second terminal enters a scanning mode, and displays a list of discovered devices, where the list of the discovered devices includes an identifier of the first dual-mode Bluetooth terminal.

For example, the user may use a physical remote controller of the household device such as the television to open a settings screen of the television, and use the physical remote controller to initiate scanning on the settings screen, so that the television enters a scanning mode.

Figure 6:
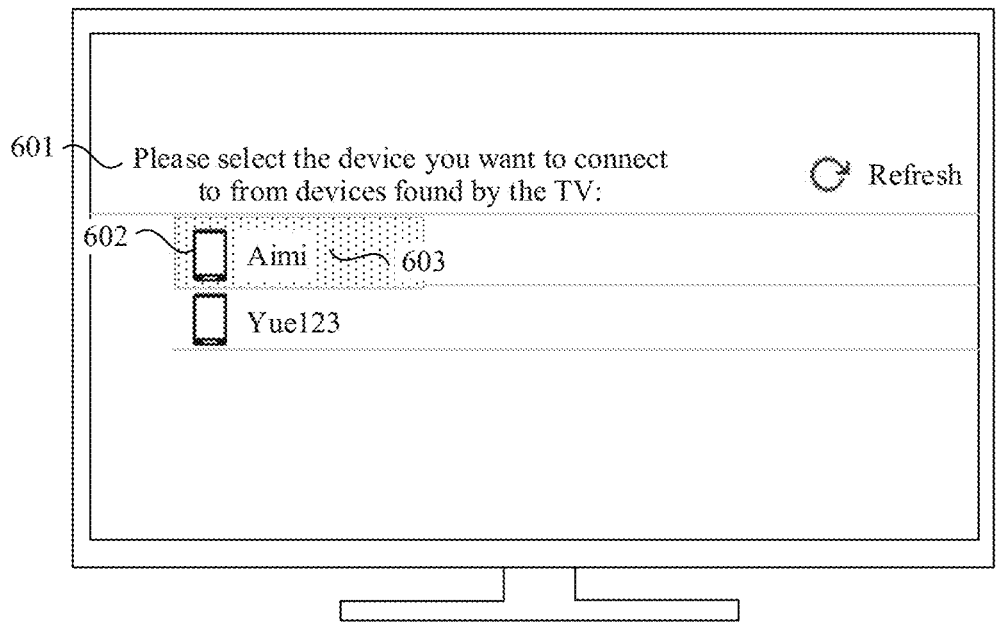
FIG. 6 is a schematic diagram of some graphical user interfaces displayed on a household device according to some embodiments of this application.

If the first dual-mode Bluetooth terminal sends the first BLE pairing advertisement message, after entering the scanning mode, the television can discover, through scanning, the first BLE pairing advertisement message sent by the first dual-mode Bluetooth terminal. When discovering the first BLE pairing advertisement message through scanning, the second terminal may determine whether the fixed advertisement address carried in the first BLE pairing advertisement message is locally stored. If the fixed advertisement address is not stored, the second terminal may display the list of the discovered devices. For example, as shown in FIG. 6, the television may further display a list 601 of discovered devices. The list 601 of the discovered devices includes an identifier, for example, an icon and a discovery name, of a device that is discovered through scanning and that sends the first BLE pairing advertisement message. For example, a discovery name of the mobile phone is "Aimi". When the mobile phone sends the first BLE pairing advertisement message, the list 601 of the discovered devices may include an icon 602 of the mobile phone and the discovery name "Aimi" 603. The second terminal may further store the fixed advertisement address.

S404: The second terminal receives input of the user for indicating to establish a BLE connection to the first dual-mode Bluetooth terminal.

S405: The second terminal sends a pairing request to the first dual-mode Bluetooth terminal in response to the input.

Figure 7:
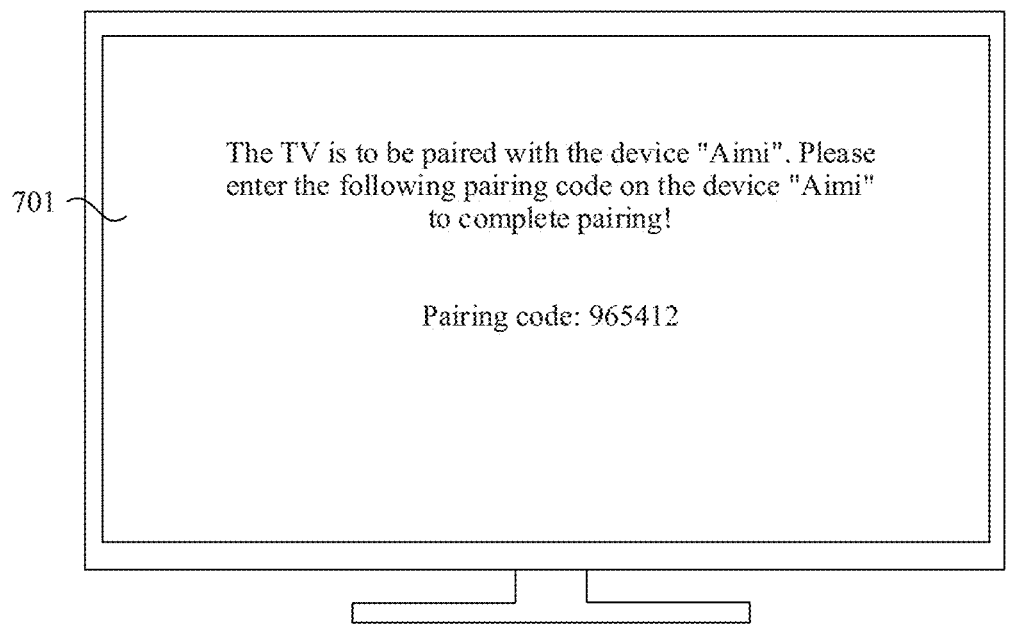
FIG. 7 is a schematic diagram of some other graphical user interfaces displayed on a household device according to some embodiments of this application.

For example, the input may be a selection operation performed by the user on the identifier of the first dual-mode Bluetooth terminal in the list of the discovered devices. After the television displays the list of the discovered devices that includes an identifier of the mobile phone, the user may perform a selection operation on the identifier, for example, the icon 602 and/or the discovery name "Aimi" 603, of the mobile phone by using the physical remote controller. Alternatively, the input may be another operation for indicating to establish a BLE connection to the first dual-mode Bluetooth terminal, for example, voice input, gesture input, or a floating operation. This is not specifically limited in this embodiment of this application. The television may initiate a pairing request to the mobile phone in response to the input. In addition, as shown in FIG. 7, in response to the input, the television may further display a prompt screen 701. The prompt screen 701 may include a pairing code 965412 that needs to be entered by the user on the mobile phone.

S406: The first dual-mode Bluetooth terminal displays a pairing window, and receives a pairing code entered by the user in the pairing window.

S407: The first dual-mode Bluetooth terminal sends a pairing response to the second terminal, where the pairing response carries the pairing code entered by the user.

Figure 8:
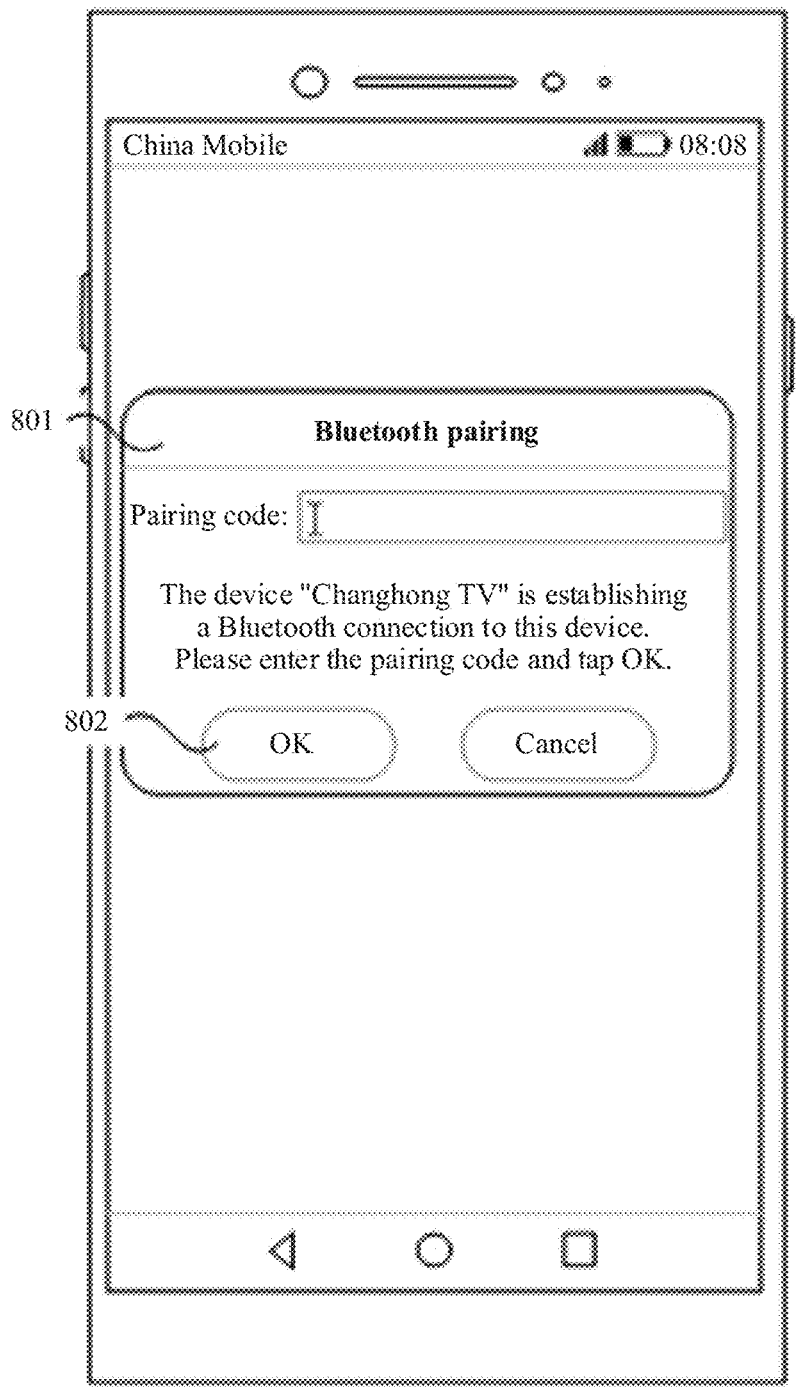
FIG. 8 is a schematic diagram of some other graphical user interfaces displayed on a first dual-mode Bluetooth terminal according to some embodiments of this application.

After the second terminal initiates the pairing request, the first dual-mode Bluetooth terminal may display the pairing window based on the received pairing request. For example, as shown in FIG. 8, the mobile phone displays a pairing window 801. In this case, the user may enter, on the mobile phone, the pairing code 965412 displayed on the television. After entering the pairing code, the user may tap an "OK" button 802. In response to the tap operation performed by the user on the "OK" button 802, the mobile phone may send, to the television, the pairing response including the pairing code entered by the user.

S408: The second terminal verifies the pairing code carried in the pairing response.

S409: After the verification succeeds, the second terminal establishes the BLE connection to the first dual-mode Bluetooth terminal.

For example, after receiving the pairing response sent by the mobile phone, the television may verify whether the pairing code carried in the pairing response is the same as the pairing code of the television. If the pairing code carried in the pairing response is the same as the pairing code of the television, the verification succeeds, and the television starts to perform pairing with the mobile phone. After the pairing succeeds, the television may establish a connection to the mobile phone based on the Bluetooth HOGP (HID Over GATT Profile) protocol. In this way, the second terminal completes establishment of the BLE connection to the first dual-mode Bluetooth terminal.

S410: The first dual-mode Bluetooth terminal sends a control command format set to the second terminal, and the first dual-mode Bluetooth terminal creates a smart remote controller.

After the BLE connection between the first dual-mode Bluetooth terminal and the second terminal is successfully established, the first dual-mode Bluetooth terminal may send the control command format set to the second terminal. The control command format set is used to define a sending format of a key control command for controlling the second terminal by using the first dual-mode Bluetooth terminal. For example, the control command format set is used to define a sending format of a key control command for controlling the second terminal by using the created smart remote controller. The second terminal can distinguish between different key control commands from the first dual-mode Bluetooth terminal based on the control command format set, so that the second terminal is controlled.

Figures 9A, 9B:
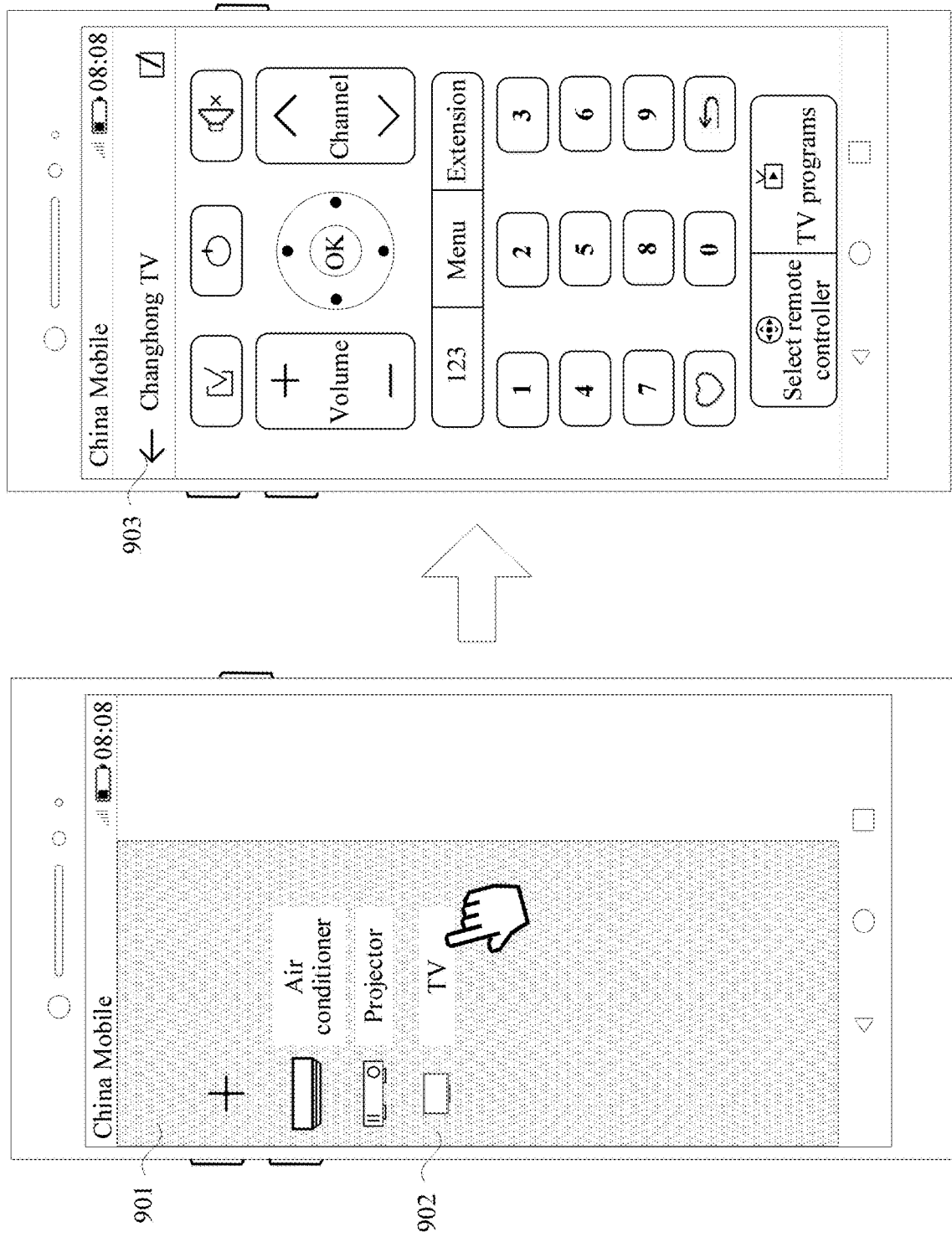
FIG. 9A and FIG. 9B are a schematic diagram of still some other graphical user interfaces displayed on a first dual-mode Bluetooth terminal according to some embodiments of this application.

The first dual-mode Bluetooth terminal may further create a corresponding smart remote controller identifier. For example, after the smart remote controller is successfully created, as shown in FIG. 9(a), the smart remote controller application on the mobile phone may create a new smart remote controller identifier 902 in a remote controller list 901. The user may perform a tap operation on the smart remote controller identifier 902. In response to the tap operation, as shown in FIG. 9(b), the mobile phone may display a control panel screen 903 of the smart remote controller. How a key included in the created smart remote controller is displayed on the control panel screen 903 may be determined by the first dual-mode Bluetooth terminal based on a predefined key code. For example, as shown in Table 1, the first dual-mode Bluetooth terminal stores a local mapping table. The local mapping table includes an association relationship between different keys and key codes. The first dual-mode Bluetooth terminal may find a corresponding key code based on a key that needs to be included in the newly created smart remote controller, and then display the corresponding key based on the found corresponding key code. It should be noted that Table 1 shows only an association relationship between some keys and key codes, and an association relationship between other keys and key codes is similar to that shown in Table 1. No enumeration is provided in this embodiment of this application.

TABLE 1

| Key | Key code |
| --- | --- |
| Home key | 120 |
| Up | 121 |
| Down | 122 |
| Left | 123 |
| Right | 124 |
| . . . | . . . |

For example, the smart remote controller of the television is successfully created on the mobile phone. The smart remote controller of the television needs to include keys such as a power key, a mute key, a volume+key, a volume− key, a channel+key, an up key, a down key, a left key, a right key, and a menu key. The first dual-mode Bluetooth terminal may search Table 1 for a key code corresponding to each key that needs to be included in the smart remote controller of the television. Then, the first dual-mode Bluetooth terminal displays the corresponding key based on the found key code corresponding to each key. For example, the control panel screen 903 includes a power key, a mute key, a volume+key, a volume-key, a channel+key, an up key, a down key, a left key, a right key, a menu key, and the like. It should be noted that the control panel screen 903 of the smart remote controller shown in FIG. 9B is merely an example of the created remote controller of the television. In specific implementation, the keys included in the control panel screen of the created smart remote controller may be adaptively adjusted based on different actual products. This is not specifically limited in this embodiment of this application.

The user may control the second terminal such as the household device by using the smart remote controller. In an example in which the household device is the television, a specific control process may be as follows: After the user taps a key of the smart remote controller, the first dual-mode Bluetooth terminal may receive a key code corresponding to the key. The first dual-mode Bluetooth terminal may search, based on the received key code, a mapping relationship (the mapping relationship shown in Table 2 includes an association relationship between key codes of different keys and key code values) shown in Table 2, to determine a key code value corresponding to the key. Then, the first dual-mode Bluetooth terminal may combine the key and the corresponding key code value based on the control command format set, to generate a corresponding key control command, and send the generated key control command to the television. After receiving the key control command, the television parses the received key control command based on the control command format set, determines the key code value corresponding to the key control command, and performs a corresponding operation based on the determined key code value. In this way, the television is controlled by using the smart remote controller created on the first dual-mode Bluetooth terminal.

TABLE 2

| Key | Key code | Key code value |
| --- | --- | --- |
| Power | 130 | 0x66 |
| Up | 121 | 0x52 |
| Down | 122 | 0x51 |
| Left | 123 | 0x50 |
| Right | 124 | 0x4F |
| OK | 131 | 0x58 |
| Home key | 120 | 0x4A |
| Back | 132 | 0x29 |
| Menu | 133 | 0x76 |
| Volume− | 134 | 0x81 |
| Volume+ | 135 | 0x80 |
| 1 | 140 | 0x1E |
| 2 | 141 | 0x1F |
| 3 | 142 | 0x20 |
| 4 | 143 | 0x21 |
| 5 | 144 | 0x22 |
| 6 | 145 | 0x23 |
| 7 | 146 | 0x24 |
| 8 | 147 | 0x25 |
| 9 | 148 | 0x26 |
| 0 | 150 | 0x27 |

It should be noted that Table 2 shows only an association relationship between key codes of some keys and key code values, and an association relationship between key codes of other keys and key code values is similar to that shown in Table 2. No enumeration is provided in this embodiment of this application. The specific values of the key code values and the key codes of the keys shown in Table 1 and Table 2 are merely examples. In specific implementation, the specific values of the key code values and the key codes of the keys may be set based on a requirement. This is not limited in this embodiment of this application.

It may be understood that the key control command sent by the first dual-mode Bluetooth terminal to the second terminal may be generated based on the control command format set. In this embodiment of this application, a specific form of the control command format set is not specifically limited. It needs only to be ensured that after the key control command generated by the first dual-mode Bluetooth terminal based on the control command format set is sent to the second terminal, the second terminal can identify, according to the received key control command, a key that is tapped by the user.

For example, for ease of understanding, the key control command generated by the first dual-mode Bluetooth terminal is described by using an example in which a control command format set of a keyboard that is defined in an existing HID protocol continues to be used as the foregoing control command format set.

For example, the control command format set is as follows:
  private static final byte[ ] REPORT MAP={
  USAGE_PAGE(1),0x01,
  USAGE(1),0x06,
  COLLECTION(1),0x01,
  USAGE_PAGE(1),0x07,
  USAGE_MINIMUM(1),(byte) 0xE0,
  USAGE_MAXIMUM(1),(byte) 0xE7,
  LOGICAL_MINIMUM(1),0x00,
  LOGICAL_MAXIMUM(1),0x01,
  REPORT_SIZE(1),0x01,
  REPORT_COUNT(1),0x08,
  INPUT(1),0x02,
  REPORT_COUNT(1),0x01,
  REPORT_SIZE(1),0x08,
  INPUT(1),0x01,
  REPORT_COUNT(1),0x05,
  REPORT_SIZE(1),0x01,
  USAGE_PAGE(1),0x08,
  USAGE_MINIMUM(1),0x01,
  USAGE_MAXIMUM(1),0x05,
  OUTPUT(1),0x02,
  REPORT_COUNT(1),0x01,
  REPORT_SIZE(1),0x03,
  OUTPUT(1),0x01,
  REPORT_COUNT(1),0x06,
  REPORT_SIZE(1),0x08,
  LOGICAL_MINIMUM(1),0x00,
  LOGICAL_MAXIMUM(1),(byte)0xA5,
  USAGE_PAGE(1),0x07,
  USAGE_MINIMUM(1),0x00,
  USAGE_MAXIMUM(1),(byte)0xA5,
  INPUT(1),0x00,
  END_COLLECTION(0),}

The control command format set defines a final sending format of the key control command. Specifically, the first field to the fourth field in the control command format set are used to define that the control command format set is a format set for defining the sending format of the key control command on the keyboard. The fifth field to the eleventh field are used to define the first byte in the sending format of the key control command, and the first byte is used to represent several keys such as alt and ctrl on the keyboard. The twelfth field to the fourteenth field are used to define the second byte in the sending format of the key control command, and the second byte is a reserved byte. The fifteenth field to the twenty-third field are used to define an LED light of the keyboard, and are an output event. The output event means that this value is not a value that needs to be carried in the key control command for sending. Therefore, the value does not need to be considered when the key control command is sent. The twenty-fourth field to the thirty-first field are used to define the third byte to the eighth byte in the sending format of the key control command, and the 6 bytes are respectively used to represent other keys on the keyboard, for example, an up key, a down key, a left key, a right key, and a number key.

Figure 10:
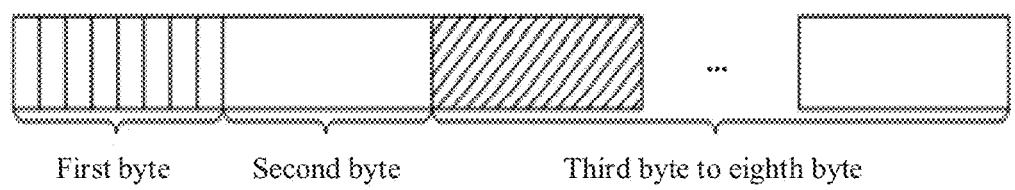
FIG. 10 is a schematic composition diagram of a sending format of a key control command according to an embodiment of this application.

It can be learned that the final sending format of the key control command defined by the control command format set includes 8 bytes, as shown in FIG. 10. The first byte is used to represent the several keys such as alt and ctrl, the second byte is the reserved byte, and the third byte to the eighth byte may be used to respectively represent the other keys such as the up key, the down key, the left key, the right key, and the number key on the keyboard. Considering that the user may simultaneously tap several keys (for example, alt and a number key 1) on the keyboard, the 8 bytes are used to define the key control command on the keyboard. In this embodiment of this application, the user taps only one key at one moment. Therefore, only 1 byte, for example, any one of the third byte to the eighth byte, may be used to represent a key of the smart remote controller, and the other bytes are represented by 0.

For example, the third byte is used to represent the key of the smart remote controller, and the household device is the television. For example, the user taps the home key of the smart remote controller of the television. The first dual-mode Bluetooth terminal may receive the key code 120 corresponding to the home key. The first dual-mode Bluetooth terminal searches the mapping relationship in Table 2 based on the received key code 120, and determines that a key code value corresponding to the home key is 0x4A. Then, the first dual-mode Bluetooth terminal may combine the home key and the corresponding key code value 0x4A based on the control command format set, to generate a corresponding key control command. For example, the generated key control command is as follows:
  byte[ ] report=new byte[8];
  report[0]=0x00;
  report[1]=0x00;
  report[2]=0x4A;
  report[3]=0x00;
  report[4]=0x00;
  report[5]=0x00;
  report[6]=0x00;
  report[7]=0x00;

After generating the key control command, the first dual-mode Bluetooth terminal may invoke a control command sending interface to send the key control command to the television. After receiving the key control command, the television parses the received key control command based on the control command format set. The television determines that the third byte in the key control command includes the key code value 0x4A, and key code values of the other bytes are all 0. The television may display a home screen based on a determined result.

In some embodiments of this application, to accurately control the second terminal such as the household device, after the control command format set is sent to the second terminal, one or more keys may be first tested. After testing on the one or more keys succeeds, the smart remote controller is successfully created. After testing on the one or more keys fails, the smart remote controller fails to be created.

Figure 11:
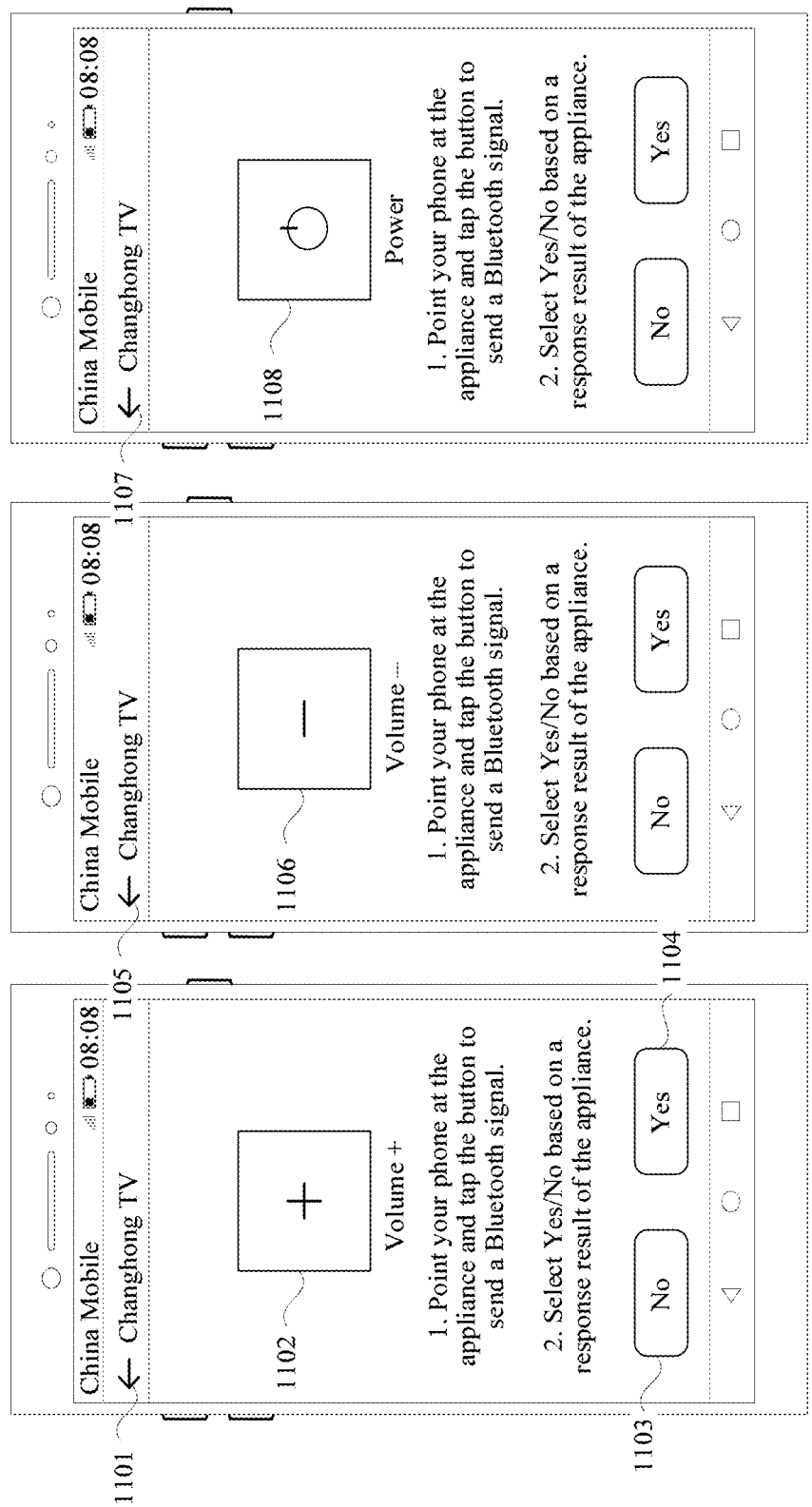
FIG. 11A to FIG. 11C are a schematic diagram of still some other graphical user interfaces displayed on a first dual-mode Bluetooth terminal according to some embodiments of this application.

With reference to FIG. 11A though FIG. 11C, for example, three keys the "volume+" key, the "volume−" key, and the "power" key, need to be tested. For example, as shown in FIG. 11A, after a BLE connection between the mobile phone and the television is successfully established, the mobile phone may display a key matching screen 1101. The key matching screen 1101 includes a tested key "volume+" 1102. The user may tap the tested key "volume+" 1102, and select a button "No" 1103 or "Yes" 1104 based on a response of the television. If volume of the television increases after the user taps the tested key "volume+" 1102, it indicates that testing on the key succeeds. After the testing on the key succeeds, the user may tap the button "Yes" 1104. In response to the tap operation, the mobile phone may display a next key matching screen. As shown in FIG. 11B, the mobile phone displays a key matching screen 1105. The key matching screen 1105 includes a tested key "volume−" 1106. The user may tap the tested key "volume−" 1106, and select a button "No" or "Yes" based on a response of the television. If the volume of the television decreases after the user taps the tested key "volume−" 1106, it indicates that testing on the key succeeds. After the testing on the key succeeds, the user may tap the button "Yes" on the key matching screen 1105. In response to the tap operation, the mobile phone may display a next key matching screen. As shown in FIG. 11C, the mobile phone displays a key matching screen 1107. The key matching screen 1107 includes a tested key "power" 1108. The user may tap the tested key "power" 1108, and select a button "No" or "Yes" based on a response of the television. If the television is powered off after the user taps the tested key "power" 1108, it indicates that testing on the key succeeds. After the testing on the key succeeds, the user may tap the button "Yes" on the key matching screen 1107. After testing on all of the foregoing three keys succeeds, it is considered that the smart remote controller is successfully created. If testing on any one of the three keys fails, the smart remote controller fails to be created. After the smart remote controller is successfully created, as shown in FIG. 9A and FIG. 9B, the mobile phone may create the new smart remote controller identifier 902 in the smart remote controller application, and display the control panel screen 903 based on a tap operation of the user. In this way, the user can control the television by using the created smart remote controller.

It should be noted that, a specific format, a generation process, and a parsing process of a key control command sent by the first dual-mode Bluetooth terminal to the second terminal in the key testing process are similar to the specific format, the generation process, and the parsing process of the key control command in the control process. For specific descriptions, refer to the corresponding descriptions of the control process. Details are not described herein.

Figure 12:
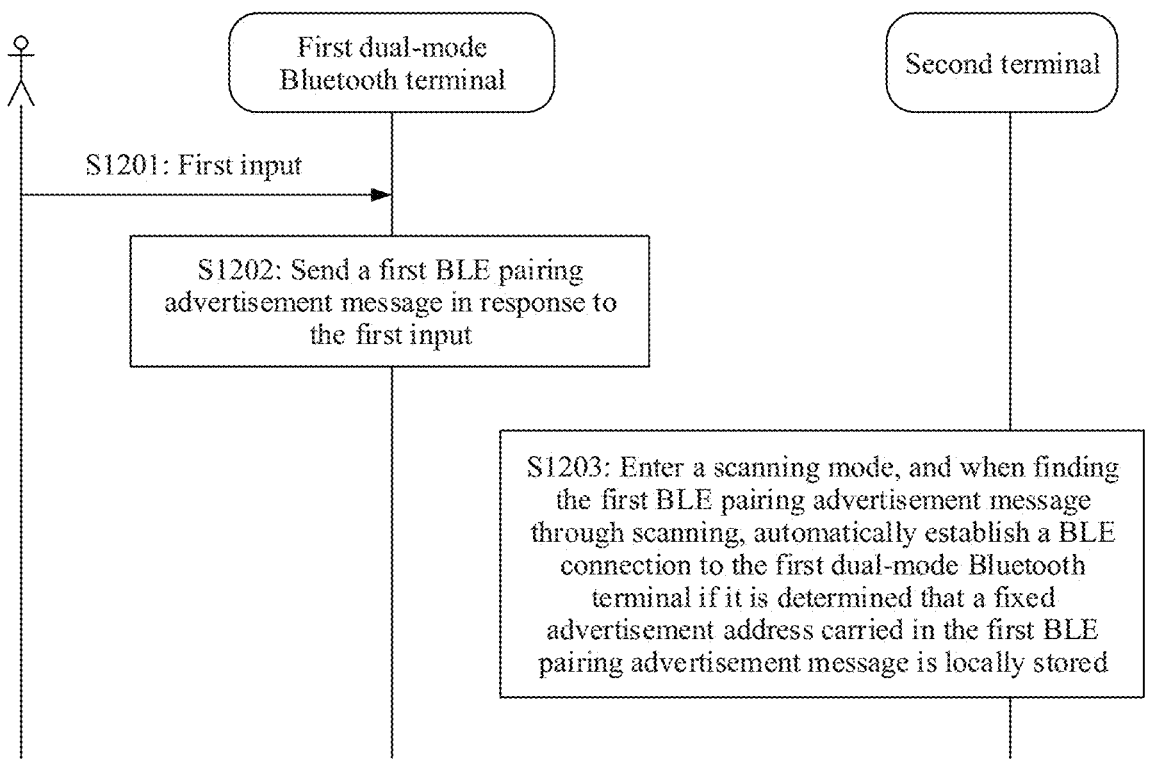
FIG. 12 is a schematic flowchart of a Bluetooth communication method according to an embodiment of this application.

In some embodiments of this application, after the user successfully creates the Bluetooth remote controller of the second terminal, in a scenario in which the user exits the first application such as the smart remote controller application, the Bluetooth function of the first dual-mode Bluetooth terminal is disabled (for example, the user manually turns off a switch button of the Bluetooth function), or the user leaves home, the BLE connection between the first dual-mode Bluetooth terminal and the second terminal such as the household device is automatically disconnected. When the user expects to control the second terminal by using the first dual-mode Bluetooth terminal again, as shown in FIG. 12, an embodiment of this application further provides a Bluetooth communication method. The method may include S1201 to S1203.

S1201: The first dual-mode Bluetooth terminal receives first input of the user.

The first input may be input for enabling a created Bluetooth remote controller when the first dual-mode Bluetooth terminal is disconnected from the second terminal. For example, the first input may be input of the user for indicating to enable a control screen of the second terminal. For example, the first input is input for triggering the first dual-mode Bluetooth terminal to display a control panel screen of the smart remote controller of the second terminal. For another example, the first input is input for triggering the first dual-mode Bluetooth terminal to display a map, and location information of a device such as a key or a sweeping robot for which the user has a positioning requirement is marked on the map. Alternatively, the first input may be input used by the user to indicate to control the second terminal when a BLE connection between the first dual-mode Bluetooth terminal and the second terminal is disconnected. For example, for an intelligent device such as a light or a fan that has only a switch or only a limited control function, the first dual-mode Bluetooth terminal may include only some simple control buttons (for example, a home screen of the first dual-mode Bluetooth terminal includes a switch button of the light), which are used to control the intelligent device. When a BLE connection between the first dual-mode Bluetooth terminal and the intelligent device is disconnected, the first input may be a tap operation performed by the user on the control button. To be specific, when the first dual-mode Bluetooth terminal receives the tap operation performed by the user on the control button, if the BLE connection between the first dual-mode Bluetooth terminal and the second terminal is disconnected, the first dual-mode Bluetooth terminal performs S1202.

S1202: The first dual-mode Bluetooth terminal sends a first BLE pairing advertisement message in response to the first input.

A specific implementation of sending the first BLE pairing advertisement message in S1202 is similar to the specific implementation of sending the first BLE pairing advertisement message in S402. Details are not described again in this embodiment of this application.

For example, when an advertisement address used by the first dual-mode Bluetooth terminal to establish the BLE connection to the second terminal always does not change, for example, the advertisement address is a MAC address of the first dual-mode Bluetooth terminal, an advertisement address in the first BLE pairing advertisement message sent by the first dual-mode Bluetooth terminal in response to the input for enabling the Bluetooth remote controller is the MAC address of the first dual-mode Bluetooth terminal.

For another example, when a fixed advertisement address used by the first dual-mode Bluetooth terminal to establish the BLE connection to the second terminal is changeable, for example, is updated every three days, an advertisement address in the first BLE pairing advertisement message sent by the first dual-mode Bluetooth terminal in response to the input for enabling the Bluetooth remote controller is a fixed address obtained after the latest update. For example, if the fixed advertisement address is updated from a fixed address 1 to a fixed address 2, and then is updated from the fixed address 2 to a fixed address 3, the advertisement address in the first BLE pairing advertisement message sent by the first dual-mode Bluetooth terminal in response to the input for enabling the Bluetooth remote controller is the fixed address 3.

For example, with reference to FIG. 9A and FIG. 9B, an example in which the household device is a television is used. The user may open a smart remote controller application. As shown in FIG. 9A, the user may perform the first input, for example, perform a tap operation on a smart remote controller identifier 902, to trigger the mobile phone to display a control panel screen 903 of a smart remote controller of the television in the foreground. Alternatively, the first input may be another operation for triggering the first dual-mode BLUETOOTH terminal to display the control panel screen of the created smart remote controller, for example, voice input, gesture input, or a floating operation. This is not specifically limited in this embodiment of this application.

The first dual-mode BLUETOOTH terminal may further send the first BLE pairing advertisement message in the background in response to the first input. Specifically, in response to the first input, the first dual-mode BLUETOOTH terminal may modify an advertisement address in a BLE advertisement message from a random advertisement address to a fixed advertisement address, modify an address type in the BLE advertisement message from random to public, and modify an identifier in the BLE advertisement message from a first value to a second value, to generate and send the first BLE pairing advertisement message, where the first value is used to indicate that the first dual-mode BLUETOOTH terminal supports BR/EDR, and the second value is used to indicate that the first dual-mode BLUETOOTH terminal does not support BR/EDR. For example, the first dual-mode BLUETOOTH terminal may invoke a newly added BLE advertisement interface to generate and send the first BLE pairing advertisement message.

S1203. The second terminal enters a scanning mode, and when discovering the first BLE pairing advertisement message through scanning, automatically establishes a BLE connection to the first dual-mode BLUETOOTH terminal if the second terminal determines that the fixed advertisement address carried in the first BLE pairing advertisement message is locally stored.

After the second terminal enters the scanning mode, if the second terminal discovers the first BLE pairing advertisement message through scanning, the second terminal may determine whether the fixed advertisement address carried in the first BLE pairing advertisement message is locally stored. When the second terminal determines that the fixed advertisement address carried in the first BLE pairing advertisement message is locally stored, it indicates that the second terminal previously established a BLE connection to the first dual-mode BLUETOOTH terminal. In this case, the second terminal may be automatically reconnected to the first dual-mode BLUETOOTH terminal, that is, automatically perform pairing and connection with the first dual-mode BLUETOOTH terminal, to establish the BLE connection. In this way, after the BLE connection between the first dual-mode BLUETOOTH terminal and the second terminal is disconnected, if the user expects to control the second terminal by using the first dual-mode BLUETOOTH terminal again, the first dual-mode BLUETOOTH terminal sends the first BLE pairing advertisement message including the fixed advertisement address, so that the first dual-mode BLUETOOTH terminal can be automatically reconnected to the second terminal. This shortens a connection establishment time, simplifies a reconnection process, and improves user experience.

In this embodiment of this application, it should be specially noted that the advertisement address in the first BLE pairing advertisement message generated by invoking the BLE advertisement interface is a fixed address. For example, the advertisement address is the MAC address of the first dual-mode BLUETOOTH terminal. In this case, if the first dual-mode BLUETOOTH terminal is in a BLE advertisement mode for a long time, the fixed address is always exposed to the outside, and another device may easily obtain the fixed address through scanning, and then trace the first dual-mode BLUETOOTH terminal based on the fixed address. This causes a specific security risk. To avoid the risk, in this embodiment of this application, only a first application such as a smart remote controller application that has invocation permission is allowed to invoke the newly added BLE advertisement interface. For example, the first dual-mode BLUETOOTH terminal may determine, based on a package name of an application that invokes the interface, whether the application that invokes the interface is the first application, and/or may configure exclusive permission for the first application, but not configure the permission for another application, to determine whether an application that invokes the interface is the first application. A time period of invoking the newly added BLE advertisement interface for BLE advertisement may be further limited. For example, after the first dual-mode BLUETOOTH terminal is successfully paired with and connected to the second terminal, advertisement is immediately stopped, and/or during pairing and connection, if connection is still unsuccessful after a preset time period, for example, 2 minutes, the first dual-mode BLUETOOTH terminal automatically stops advertisement.

It should be noted that the embodiments shown in FIG. 4 and FIG. 12 are described by using an example in which the second terminal is the household device, and the smart remote controller of the second terminal is created on the first dual-mode BLUETOOTH terminal to control the second terminal. When the second terminal is an intelligent device such as a light or a fan that has only a switch or only a limited control function, or when the second terminal is a device such as a key, a sweeping robot, a BLUETOOTH headset, or smart glasses for which the user has a positioning requirement, a difference between a process in which the first dual-mode BLUETOOTH terminal and the second terminal establish a connection and perform reconnection and a process in the embodiments shown in FIG. 4 and FIG. 12 lies in that, after entering the scanning mode, if the second terminal receives the first BLE pairing advertisement message from the first dual-mode BLUETOOTH terminal, the second terminal does not need to perform an operation of displaying a list of discovered devices, but may directly receive input of the user for indicating to establish a BLE connection to the first dual-mode BLUETOOTH terminal. For example, the second terminal receives tapping performed by the user on a button of the second terminal, and the second terminal may send a pairing request to the first dual-mode BLUETOOTH terminal in response to the input. In addition, because the device such as the light or the fan has only the switch or only the limited control function, and the device such as the key, the sweeping robot, the BLUETOOTH headset, or the smart glasses has/have only the positioning requirement, S410 may not need to be performed. To be specific, after the BLE connection between the first dual-mode BLUETOOTH terminal and the second terminal is successfully established, the first dual-mode BLUETOOTH terminal may create a simple remote controller to control the second terminal. For example, the first dual-mode BLUETOOTH terminal creates a switch button of the light to turn on or turn off the light. For another example, the first dual-mode BLUETOOTH terminal may display a map, and location information of the key is marked on the map. Other processes are similar to those in the embodiments shown in FIG. 4 and FIG. 12. Details are not described herein again.

In addition, in this embodiment of this application, in addition to sending the first BLE pairing advertisement message in response to the first input of the user, the first dual-mode BLUETOOTH terminal may further send a second BLE pairing advertisement message in response to second input of the user after receiving the second input. The second input is different from the first input. An address type in the second BLE pairing advertisement message is random, an advertisement address in the second BLE pairing advertisement message is a random advertisement address, and the second BLE pairing advertisement message carries an identifier used to indicate that the first dual-mode BLUETOOTH terminal supports BR/EDR. For example, when receiving the second input, in response to the second input, the first dual-mode BLUETOOTH terminal may invoke a native BLE advertisement interface to generate and send the second BLE pairing advertisement message. The second input may be input for enabling a BLUETOOTH function of the first dual-mode BLUETOOTH terminal.

In addition, in this embodiment of this application, in response to the second input, the first dual-mode BLUETOOTH terminal may further enter a conventional BLUETOOTH discoverable mode, and receive a paging message. In response to the received paging message, the first dual-mode BLUETOOTH terminal may send a paging response. The paging response carries the MAC address of the first dual-mode BLUETOOTH terminal. It should be noted that a process in which the first dual-mode BLUETOOTH terminal enters the conventional BLUETOOTH discoverable mode in response to the second input to establish a conventional BLUETOOTH connection to another device is the same as a discovery and establishment process in conventional BLUETOOTH in the prior art. For a packet format of the paging message and a packet format of the paging response, refer to corresponding descriptions in an existing standard protocol. Details are not described in this embodiment of this application.

According to the BLUETOOTH communication method provided in the embodiments of this application, the first dual-mode BLUETOOTH terminal such as the mobile phone can control the second terminal based on BLE BLUETOOTH, and another third-party application on the first dual-mode BLUETOOTH terminal can still invoke a native BLE advertisement interface to establish a BLE connection to another device. This ensures security when another application uses BLE.

It may be understood that to implement the foregoing functions, the first dual-mode BLUETOOTH terminal includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

An embodiment of this application further provides a dual-mode BLUETOOTH terminal for implementing the foregoing method embodiments. Specifically, the dual-mode BLUETOOTH terminal may be divided into function modules. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. In actual implementation, there may be another division manner.

Figure 13:
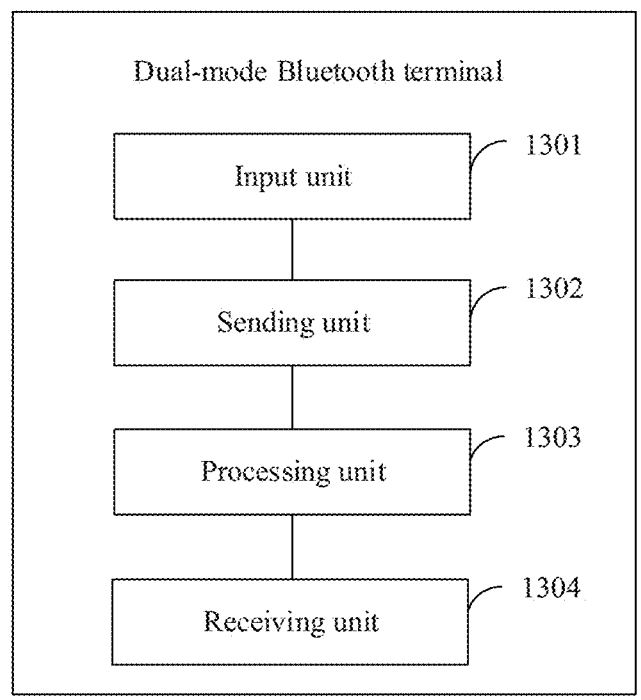
FIG. 13 is a schematic composition diagram of a dual-mode Bluetooth terminal according to an embodiment of this application.

When each function module is obtained through division based on each corresponding function, FIG. 13 is a possible schematic structural diagram of the dual-mode BLUETOOTH terminal in the foregoing embodiments. The dual-mode BLUETOOTH terminal may include an input unit 1301 and a sending unit 1302, and may further include a processing unit 1303 and a receiving unit 1304.

The input unit 1301 is configured to receive input of a user on a display screen of the dual-mode BLUETOOTH terminal, for example, touch input, voice input, gesture input, or a floating operation. The input unit 1301 is configured to support the dual-mode BLUETOOTH terminal in performing S401, S1201, and the operation of receiving the pairing code entered by the user in S406 in the foregoing method embodiments, and/or another process of the technology described in this specification. The input unit 1301 may be a touchscreen, other hardware, or a combination of hardware and software.

The sending unit 1302 is configured to support the dual-mode BLUETOOTH terminal in performing S402, S407, S410, S1202, and the operation of sending the paging response in the foregoing method embodiments, and/or another process of the technology described in this specification.

The processing unit 1303 is configured to support the dual-mode BLUETOOTH terminal in performing the operation of entering the conventional BLUETOOTH discoverable mode and the operation of establishing the BLE connection to the second terminal in the foregoing method embodiments, and/or another process of the technology described in this specification.

The receiving unit 1304 is configured to support the dual-mode BLUETOOTH terminal in performing the operation of receiving the paging message in the foregoing method embodiments and/or another process of the technology described in this specification.

In this embodiment of this application, the dual-mode BLUETOOTH terminal may further include a display unit.

The display unit is configured to support the dual-mode BLUETOOTH terminal in performing a display operation such as the operation of displaying the pairing window in the foregoing method embodiments, and/or another process of the technology described in this specification.

All related content of the steps in the foregoing method embodiments may be cited in function descriptions of corresponding function modules. Details are not described herein again.

Certainly, the dual-mode BLUETOOTH terminal includes but is not limited to the unit modules listed above. In addition, functions that can be specifically implemented by the function units include but are not limited to functions corresponding to the method steps in the foregoing embodiments. For a detailed description of another unit of the dual-mode BLUETOOTH terminal, refer to the detailed description of the method step corresponding to the unit. Details are not described in this embodiment of this application.

When an integrated unit is used, the dual-mode BLUETOOTH terminal in the foregoing embodiments may include a processing module, a storage module, and a display module. The processing module is configured to control and manage an action of the dual-mode BLUETOOTH terminal. The display module is configured to display content according to an indication of the processing module. The storage module is configured to store program code and data of the dual-mode BLUETOOTH terminal. Further, the dual-mode BLUETOOTH terminal may include an input module and a communications module. The communications module is configured to support communication between the dual-mode BLUETOOTH terminal and another network entity, to implement functions such as a call of the terminal, data exchange, and internet access.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

When the processing module is a processor, the communications module is an RF circuit, the storage module is a memory, and the display module is a touchscreen, the dual-mode BLUETOOTH terminal provided in this embodiment of this application may be the mobile phone shown in FIG. 2. The communications module may include not only the RF circuit, but also a WI-FI module, an NFC module, and a BLUETOOTH module. The communications modules such as the RF circuit, the NFC module, the WI-FI module, and the BLUETOOTH module may be collectively referred to as a communications interface. The processor, the RF circuit, the touchscreen, and the memory may be coupled together by using a bus.

Figure 14:
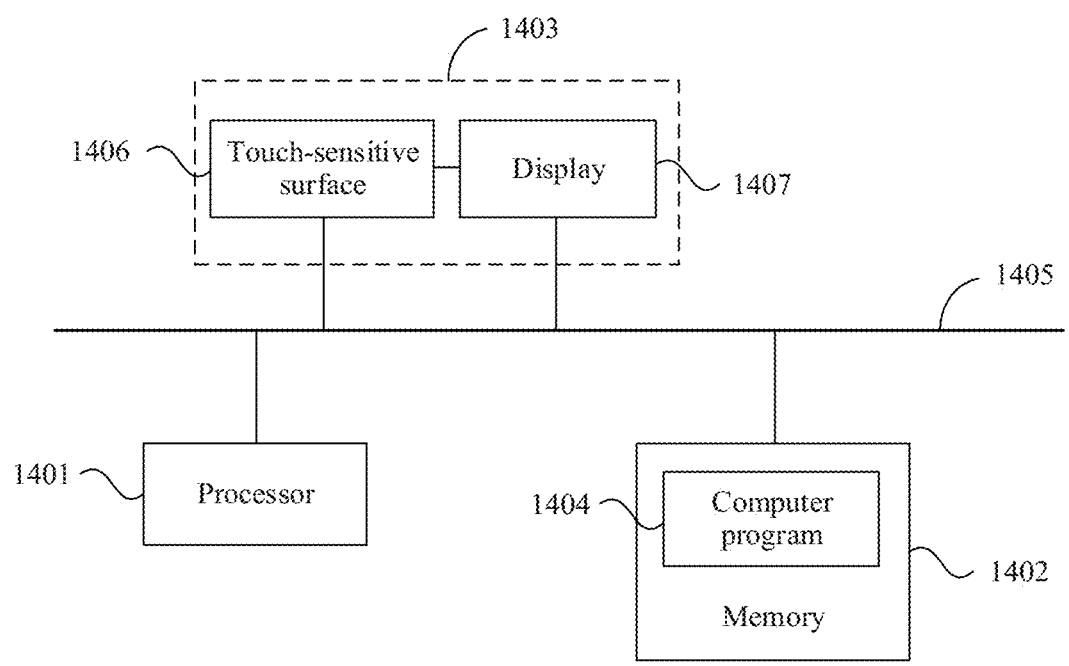
FIG. 14 is a schematic composition diagram of another dual-mode Bluetooth terminal according to an embodiment of this application.

As shown in FIG. 14, some other embodiments of this application further provide a dual-mode BLUETOOTH terminal. The dual-mode BLUETOOTH terminal may include one or more processors 1401, a memory 1402, a touchscreen 1403, and one or more computer programs 1404. The foregoing components may be connected by using one or more communications buses 1405. The touchscreen 1403 may include a touch-sensitive surface 1406 and a display 1407. The one or more computer programs 1404 are stored in the memory 1402 and are configured to be executed by the one or more processors 1401. The one or more computer programs 1404 may include an instruction, and the instruction may be used to perform steps in FIG. 4 and corresponding embodiments. In some other embodiments of this application, the instruction may be alternatively used to perform steps in FIG. 12 and corresponding embodiments. Certainly, the dual-mode BLUETOOTH terminal includes but is not limited to the components listed above. For example, the dual-mode BLUETOOTH terminal may further include a RF circuit, a positioning apparatus, a sensor, and the like. When the dual-mode BLUETOOTH terminal includes another component, the dual-mode BLUETOOTH terminal may be the mobile phone shown in FIG. 2.

Some other embodiments of this application further provide a computer storage medium. The computer storage medium stores computer program code. When a dual-mode BLUETOOTH terminal executes the computer program code, the dual-mode BLUETOOTH terminal performs related method steps in FIG. 4 or FIG. 12 to implement the BLUETOOTH communication method in the foregoing embodiment.

Some other embodiments of this application further provide a computer program product. When the computer program product is run on a computer, the computer is enabled to perform related method steps in FIG. 4 or FIG. 12 to implement the BLUETOOTH communication method in the foregoing embodiment.

Some other embodiments of this application further provide a control device. The control device includes a processor and a memory. The memory is configured to store computer program code, and the computer program code includes a computer instruction. When the processor executes the computer instruction, the control device performs related method steps in FIG. 4 or FIG. 12 to implement the BLUETOOTH communication method in the foregoing embodiment. The control device may be an IC, or may be a system on chip (SOC). The IC may be a universal IC, or may be a field programmable gate array (FPGA), or may be an ASIC.

Some other embodiments of this application further provide a BLUETOOTH communications apparatus. The apparatus has a function of implementing behavior of the dual-mode BLUETOOTH terminal in the foregoing method. The function may be implemented by hardware, or may be implemented by hardware executing corresponding software. The hardware or software includes one or more modules corresponding to the foregoing function.

The dual-mode BLUETOOTH terminal, the computer storage medium, the computer program product, the control device, and the BLUETOOTH communications apparatus provided in the embodiments of this application are all configured to perform corresponding methods provided above. Therefore, for beneficial effects that can be achieved by the dual-mode BLUETOOTH terminal, the computer storage medium, the computer program product, the control device, and the BLUETOOTH communications apparatus, refer to the beneficial effects of the corresponding methods provided above. Details are not described herein again.

The foregoing descriptions about implementations allow a person skilled in the art to clearly understand that, for the purpose of convenient and brief description, only division into the foregoing function modules is taken as an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in the embodiments of this application, it should be understood that the disclosed system, apparatus, and method may be implemented in other manners. For example, the described apparatus embodiments are merely examples. For example, the division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A dual-mode BLUETOOTH terminal, comprising:
    a processor; and
    a memory coupled to the processor and configured to store instructions that, when executed by the processor, cause the dual-mode BLUETOOTH terminal to be configured to:
        send a first BLUETOOTH Low Energy (BLE) pairing advertisement message in response to a first input from a user, wherein a first address type in the first BLE pairing advertisement message is public, wherein a first advertisement address in the first BLE pairing advertisement message is a fixed advertisement address, and wherein the first BLE pairing advertisement message carries a first identifier indicating that the dual-mode BLUETOOTH terminal does not support BLUETOOTH basic rate/enhanced data rate (BR/EDR);
        enter a conventional BLUETOOTH discoverable mode in response to a second input from the user; and
        send a paging response in response to a paging message from a receiver,
        wherein the paging response carries a media access control (MAC) address of the dual-mode BLUETOOTH terminal, and
        wherein the first input is different from the second input.

2. The dual-mode BLUETOOTH terminal of claim 1, wherein the instructions further cause the dual-mode BLUETOOTH terminal to be configured to send a second BLE pairing advertisement message in response to the second input, wherein a second address type in the second BLE pairing advertisement message is random, wherein a second advertisement address in the second BLE pairing advertisement message is a random advertisement address, and wherein the second BLE pairing advertisement message carries a second identifier used to indicate that the dual-mode BLUETOOTH terminal supports the BR/EDR.

3. The dual-mode BLUETOOTH terminal of claim 1, wherein the instructions further cause the dual-mode BLUETOOTH terminal to be configured to create a BLUETOOTH remote controller in response to the first input.

4. The dual-mode BLUETOOTH terminal of claim 1, wherein the fixed advertisement address is the MAC address.

5. The dual-mode BLUETOOTH terminal of claim 1, wherein the instructions further cause the dual-mode BLUETOOTH terminal to be configured to:
    modify a third advertisement address in a BLE advertisement message from a random advertisement address to the fixed advertisement address;
    modify a third address type in the BLE advertisement message from random to public;
    modify, in response to the first input, a third identifier in the BLE advertisement message from a first value to a second value to generate the first BLE pairing advertisement message, wherein the first value indicates that the dual-mode BLUETOOTH terminal supports the BR/EDR, and wherein the second value indicates that the dual-mode BLUETOOTH terminal does not support the BR/EDR; and
    send the first BLE pairing advertisement message.

6. The dual-mode BLUETOOTH terminal of claim 5, wherein the instructions further cause the dual-mode BLUETOOTH terminal to be configured to:
    invoke a BLE advertisement interface;
    generate the BLE advertisement message;
    modify the third advertisement address from the random advertisement address to the fixed advertisement address;
    modify the third address type from random to public;
    modify, in response to the first input, the third identifier from the first value to the second value to generate the first BLE pairing advertisement message; and
    send the first BLE pairing advertisement message.

7. The dual-mode BLUETOOTH terminal of claim 6, wherein the instructions further cause the dual-mode BLUETOOTH terminal to be configured to:
    determine, in response to the first input, that an application invoking the BLE advertisement interface is a first application, wherein the first application has permission to invoke the BLE advertisement interface;
    invoke the BLE advertisement interface;
    generate the BLE advertisement message;
    modify the third advertisement address from the random advertisement address to the fixed advertisement address;
    modify the third address type from random to public;
    modify the third identifier from the first value to the second value to generate the first BLE pairing advertisement message; and
    send the first BLE pairing advertisement message.

8. The dual-mode BLUETOOTH terminal of claim 1, wherein the instructions further cause the dual-mode BLUETOOTH terminal to be configured to stop sending the first BLE pairing advertisement message when a BLE connection fails to be established within a preset time period after the first BLE pairing advertisement message is sent.

9. The dual-mode BLUETOOTH terminal of claim 1, wherein the instructions further cause the dual-mode BLUETOOTH terminal to modify the fixed advertisement address from a first fixed address to a second fixed address after a predetermined time period.

10. The dual-mode BLUETOOTH terminal of claim 1, wherein the second input enables a BLUETOOTH function of the dual-mode BLUETOOTH terminal.

11. The dual-mode BLUETOOTH terminal of claim 1, wherein the instructions further cause the dual-mode BLUETOOTH terminal to enable a BLUETOOTH remote controller in response to the first input.

12. A dual-mode BLUETOOTH terminal, comprising:
a processor; and
a memory coupled to the processor and configured to store instructions that, when executed by the processor, cause the dual-mode BLUETOOTH terminal to be configured to:
send a first BLUETOOTH Low Energy (BLE) pairing advertisement message in response to a first input from a user, wherein a first address type in the first BLE pairing advertisement message is public, wherein a first advertisement address in the first BLE pairing advertisement message is a fixed advertisement address, and wherein the first BLE pairing advertisement message carries a first identifier used to indicate that the dual-mode BLUETOOTH terminal does not support BLUETOOTH basic rate/enhanced data rate (BR/EDR); and
send a second BLE pairing advertisement message in response to a second input from the user,
wherein a second address type in the second BLE pairing advertisement message is random,
wherein a second advertisement address in the second BLE pairing advertisement message is a random advertisement address, and
wherein the second BLE pairing advertisement message carries a second identifier indicating that the dual-mode BLUETOOTH terminal supports the BR/EDR.

13. The dual-mode BLUETOOTH terminal of claim 12, wherein the instructions further cause the dual-mode BLUETOOTH terminal to be configured to create a BLUETOOTH remote controller or enable the BLUETOOTH remote controller in response to the first input.

14. The dual-mode BLUETOOTH terminal of claim 12, wherein the fixed advertisement address is a media access control (MAC) address.

15. The dual-mode BLUETOOTH terminal of claim 12, wherein the instructions further cause the dual-mode BLUETOOTH terminal to be configured to:
modify a third advertisement address in a BLE advertisement message from the random advertisement address to the fixed advertisement address;
modify a third address type from random to public;
modify, in response to the first input, a third identifier from a first value to a second value to generate the first BLE pairing advertisement message, wherein the first value indicates that the dual-mode BLUETOOTH terminal supports the BR/EDR, and wherein the second value indicates that the dual-mode BLUETOOTH terminal does not support the BR/EDR; and
send the first BLE pairing advertisement message.

16. The dual-mode BLUETOOTH terminal of claim 15, wherein the instructions further cause the dual-mode BLUETOOTH terminal to be configured to:
determine, in response to the first input, that an application invoking the BLE advertisement interface is a first application, wherein the first application has permission to invoke the BLE advertisement interface;
invoke the BLE advertisement interface;
generate the BLE advertisement message;
modify the third advertisement address from the random advertisement address to the fixed advertisement address;
modify the third address type from random to public;
modify the third identifier from the first value to the second value to generate the first BLE pairing advertisement message; and
send the first BLE pairing advertisement message.

17. The dual-mode BLUETOOTH terminal of claim 12, wherein the instructions further cause the dual-mode BLUETOOTH terminal to be configured to stop sending the first BLE pairing advertisement message when a BLE connection fails to be established within a preset time period after the first BLE pairing advertisement message is sent.

18. The dual-mode BLUETOOTH terminal of claim 12, wherein the instructions further cause the dual-mode BLUETOOTH terminal to modify the fixed advertisement address from a first fixed address to a second fixed address after a predetermined time period.

19. The dual-mode BLUETOOTH terminal of claim 12, wherein the instructions further cause the dual-mode BLUETOOTH terminal to enable a BLUETOOTH function of the dual-mode BLUETOOTH terminal in response to the second input a function of the dual-mode terminal.

20. A computer program product comprising computer-executable instructions stored on a non-transitory computer-readable medium that, when executed by a processor, cause a dual-mode BLUETOOTH terminal to:
send a first BLUETOOTH low energy (BLE) pairing advertisement message after receiving a first input from a user, wherein a first address type in the first BLE pairing advertisement message is public, wherein a first advertisement address in the first BLE pairing advertisement message is a fixed advertisement address, and wherein the first BLE pairing advertisement message carries a first identifier used to indicate that the first dual-mode BLUETOOTH terminal does not support BLUETOOTH basic rate/enhanced data rate (BR/EDR);
enter a conventional BLUETOOTH discoverable mode in response to a second input from the user; and
send a paging response in response to receiving a paging message, wherein the paging response carries a media access control (MAC) address of the first dual-mode BLUETOOTH terminal, and wherein the first input is different from the second input.

* * * * *

UNITED STATES PATENT AND TRADEMARK OFFICE
CERTIFICATE OF CORRECTION

PATENT NO. : 12,004,061 B2
APPLICATION NO. : 17/264491
DATED : June 4, 2024
INVENTOR(S) : Yunsheng Peng, Zhonglin Xia and Chun Liu Page 1 of 1

It is certified that error appears in the above-identified patent and that said Letters Patent is hereby corrected as shown below:

In the Claims

Claim 15, Column 37, Line 62: "type from" should read "type in the BLE advertisement message from"

Claim 15, Column 37, Line 64: "from" should read "in the BLE advertisement message from"

Signed and Sealed this
Thirtieth Day of July, 2024

Katherine Kelly Vidal
*Director of the United States Patent and Trademark Office*